(12) United States Patent
Tripathi et al.

(10) Patent No.: US 9,495,926 B2
(45) Date of Patent: Nov. 15, 2016

(54) VARIABLE FRAME REFRESH RATE

(71) Applicant: Apple Inc., Cupertino, CA (US)

(72) Inventors: Brijesh Tripathi, Los Altos, CA (US);
Peter F. Holland, Los Gatos, CA (US);
Arthur L. Spence, San Jose, CA (US);
Axel B. Schumacher, San Francisco, CA (US); David A. Hartley, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 14/557,001

(22) Filed: Dec. 1, 2014

(65) Prior Publication Data

US 2016/0155399 A1 Jun. 2, 2016

(51) Int. Cl.
*G06F 3/038* (2013.01)
*G09G 3/36* (2006.01)
*G06T 1/20* (2006.01)
*G06T 1/60* (2006.01)

(52) U.S. Cl.
CPC ............... *G09G 3/3614* (2013.01); *G06T 1/20* (2013.01); *G06T 1/60* (2013.01); *G09G 3/3696* (2013.01); *G09G 2320/0266* (2013.01)

(58) Field of Classification Search
None
See application file for complete search history.

(56) References Cited

U.S. PATENT DOCUMENTS

| | | | |
|---|---|---|---|
| 5,253,078 A | 10/1993 | Balkanski et al. | |
| 5,537,650 A | 7/1996 | West et al. | |
| 5,615,376 A | 3/1997 | Ranganathan | |
| 6,011,546 A | 1/2000 | Bertram | |
| 6,298,370 B1 | 10/2001 | Tang et al. | |
| 6,938,176 B1 | 8/2005 | Alben et al. | |
| 8,117,481 B2 | 2/2012 | Anselmi et al. | |
| 8,767,777 B2 | 7/2014 | Kobayashi | |
| 9,116,639 B2 | 8/2015 | Tripathi | |
| 2008/0212729 A1 | 9/2008 | Shaanan | |
| 2009/0196209 A1 | 8/2009 | Haartsen | |

(Continued)

FOREIGN PATENT DOCUMENTS

| | | |
|---|---|---|
| EP | 2211510 B1 | 8/2011 |
| EP | 2428878 A2 | 3/2012 |
| WO | 2014032385 A1 | 3/2014 |

OTHER PUBLICATIONS

International Search Report and Written Opinion from PCT/US2013/075665, mailed May 19, 2014, 10 pages.

(Continued)

*Primary Examiner* — Yingchun He
(74) *Attorney, Agent, or Firm* — Rory D. Rankin; Meyertons, Hood, Kivlin, Kowert & Goetzel, P.C.

(57) ABSTRACT

Systems, apparatuses, and methods for preventing charge accumulation on a display panel of a display. A display pipeline is configured to drive a display using a variable frame refresh rate. The display may also be driven by a polarity inversion cadence to alternate the polarity on the display panel on back-to-back frames. In some cases, the frame refresh rate cadence, as specified in frame packets which contain configuration data for processing corresponding frames, can cause a charge accumulation on the display panel if an odd number of frames are displayed at a first frame refresh rate before switching to a second frame refresh rate. Accordingly, in these cases, the display pipeline may override the frame refresh rate setting for a given frame to cause an even number of frames to be displayed at the first frame refresh rate.

20 Claims, 17 Drawing Sheets

(56) References Cited

U.S. PATENT DOCUMENTS

| | | |
|---|---|---|
| 2010/0237847 A1 | 9/2010 | Finney |
| 2011/0292059 A1 | 12/2011 | Kobayashi |
| 2011/0299512 A1 | 12/2011 | Fukuda |
| 2012/0068994 A1 | 3/2012 | Li et al. |
| 2012/0207208 A1 | 8/2012 | Wyatt et al. |
| 2012/0317607 A1 | 12/2012 | Wyatt et al. |
| 2013/0021352 A1 | 1/2013 | Wyatt et al. |
| 2013/0057511 A1 | 3/2013 | Shepelev et al. |
| 2013/0305074 A1 | 11/2013 | Ellis et al. |
| 2013/0314429 A1 | 11/2013 | Croxford et al. |
| 2014/0071062 A1 | 3/2014 | Fang |
| 2014/0173313 A1 | 6/2014 | Tripathi et al. |
| 2014/0292787 A1 | 10/2014 | Tripathi et al. |
| 2014/0368484 A1* | 12/2014 | Tanaka et al. ....... G09G 3/3648 345/208 |
| 2015/0098020 A1 | 4/2015 | Vill |
| 2015/0194111 A1* | 7/2015 | Slavenburg et al. G09G 3/3618 345/209 |
| 2015/0348496 A1 | 12/2015 | Santos, II et al. |
| 2015/0355762 A1 | 12/2015 | Tripathi et al. |

OTHER PUBLICATIONS

Wiley, Craig, "eDP™ Embedded DisplayPort™: The New Generation Digital Display Interface for Embedded Applications", DisplayPort Developer Conference, Dec. 6, 2010, 30 pages.

International Search Report and Written Opinion in International Application No. PCT/US2015/030731, mailed Aug. 31, 2015, 10 pages.

Holland, et al., U.S. Appl. No. 14/500,570, entitled "Reduced Frame Refresh Rate", filed Sep. 29, 2014, 44 pages.

Holland, et al., U.S. Appl. No. 14/676,565, entitled "Managing Back Pressure During Compressed Frame Writeback for Idle Screens", filed Apr. 1, 2015, 50 pages.

* cited by examiner

VARIABLE FRAME REFRESH RATE

BACKGROUND

1. Technical Field

Embodiments described herein relate to the field of graphical information processing and more particularly, to preventing visual artifacts when dynamically adjusting the frame refresh rate of a display.

2. Description of the Related Art

Part of the operation of many computer systems, including portable digital devices such as mobile phones, notebook computers and the like, is to employ a display device, such as a liquid crystal display (LCD), to display images, video information/streams, and data. Accordingly, these systems typically incorporate functionality for generating images and data, including video information, which are subsequently output to the display device. Such devices typically include video graphics circuitry (i.e., a display pipeline) to process images and video information for subsequent display.

In digital imaging, the smallest item of information in an image is called a "picture element," more generally referred to as a "pixel." For convenience, pixels are generally arranged in a regular two-dimensional grid. By using such an arrangement, many common operations can be implemented by uniformly applying the same operation to each pixel independently. Since each pixel is an elemental part of a digital image, a greater number of pixels can provide a more accurate representation of the digital image. To represent a specific color on an electronic display, each pixel may have three values, one each for the amounts of red, green, and blue present in the desired color. Some formats for electronic displays may also include a fourth value, called alpha, which represents the transparency of the pixel. This format is commonly referred to as ARGB or RGBA. Another format for representing pixel color is YCbCr, where Y corresponds to the luma, or brightness, of a pixel and Cb and Cr correspond to two color-difference chrominance components, representing the blue-difference (Cb) and red-difference (Cr).

Most images and video information displayed on display devices such as LCD screens are interpreted as a succession of ordered image frames, or frames for short. While generally a frame is one of the many still images that make up a complete moving picture or video stream, a frame can also be interpreted more broadly as simply a still image displayed on a digital (discrete or progressive scan) display. A frame typically consists of a specified number of pixels according to the resolution of the image/video frame. Most graphics systems use memories (commonly referred to as "frame buffers") to store the pixels for image and video frame information. The information in a frame buffer typically consists of color values for every pixel to be displayed on the screen.

LCDs typically include an LCD panel having, among other things, a liquid crystal layer and various circuitry for controlling orientation of liquid crystals within the layer to modulate an amount of light passing through the LCD panel and thereby render images on the panel. If a voltage of a single polarity is consistently applied to the liquid crystal layer, a biasing (polarization) of the liquid crystal layer may occur such that the light transmission characteristics of the liquid crystal layer may be disadvantageously altered.

SUMMARY

Systems, apparatuses, and methods for preventing a charge accumulation on a display being driven by a variable frame refresh rate are contemplated.

In one embodiment, an apparatus may include at least one display pipeline driving pixels to one or more displays. In one embodiment, the apparatus may include a liquid crystal display (LCD), and periodic inversion of the electric field may be applied to the liquid crystal layer of the display to prevent the biasing of the liquid crystal layer. The periodic inversion of the electric field may be applied to the liquid crystal layer by alternating the polarity on consecutive frames being displayed.

Short-term charge accumulation will occur on the display panel during the time the pixels are holding a voltage level. A first frame displayed at a low frame refresh rate will hold the voltage for longer than a second frame displayed at a high frame refresh rate. For example, a first frame displayed at a 30 Hz frame refresh rate will hold the voltage for twice as long as a second frame displayed at a 60 Hz frame refresh rate. Therefore, the charge accumulation for the first frame is twice as large as for the second frame.

By alternating the polarity on every frame which is displayed, long-term charge accumulation is avoided for displays with fixed frame refresh rates. However, for embodiments in which the frame refresh rate is dynamic and in which the frame refresh rate cadence matches up with the polarity inversion cadence, long-term charge accumulation can build up on the display. To mitigate this charge accumulation over sequences of multiple frames, the display pipeline may be configured to implement one or more of a plurality of different types of charge accumulation prevention techniques. These techniques are described in more detail throughout this disclosure.

In one embodiment, a display pipeline may be configured to drive pixels to the display at a 60 hertz (Hz) frame refresh rate and a 30 Hz frame refresh rate, wherein the frame refresh rate is changed between the two rates as specified in frame packets received by the display pipeline. In one embodiment, in order to prevent a charge accumulation on the liquid crystal layer of the display, the display pipeline may be configured to enforce a requirement that an even number of 60 Hz frames are driven to the display before the frame refresh rate is switched to the 30 Hz frame refresh rate. If an odd number of frames are specified to be displayed at the 60 Hz frame refresh rate, the display pipeline may override the 30 Hz frame refresh rate setting for a single frame to make the total number of frames displayed at 60 Hz an even number.

In embodiments with more than two refresh rates, the display pipeline may be configured to require an even number of frames before changing the frame refresh rate on all but one of the frame refresh rates. For example, if refresh rates of 120, 90, 60, and 30 Hz are utilized, then the display pipeline may require an even number of frames for frames being displayed at 120, 90, and 60 Hz refresh rates before the frame refresh rate is changed.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
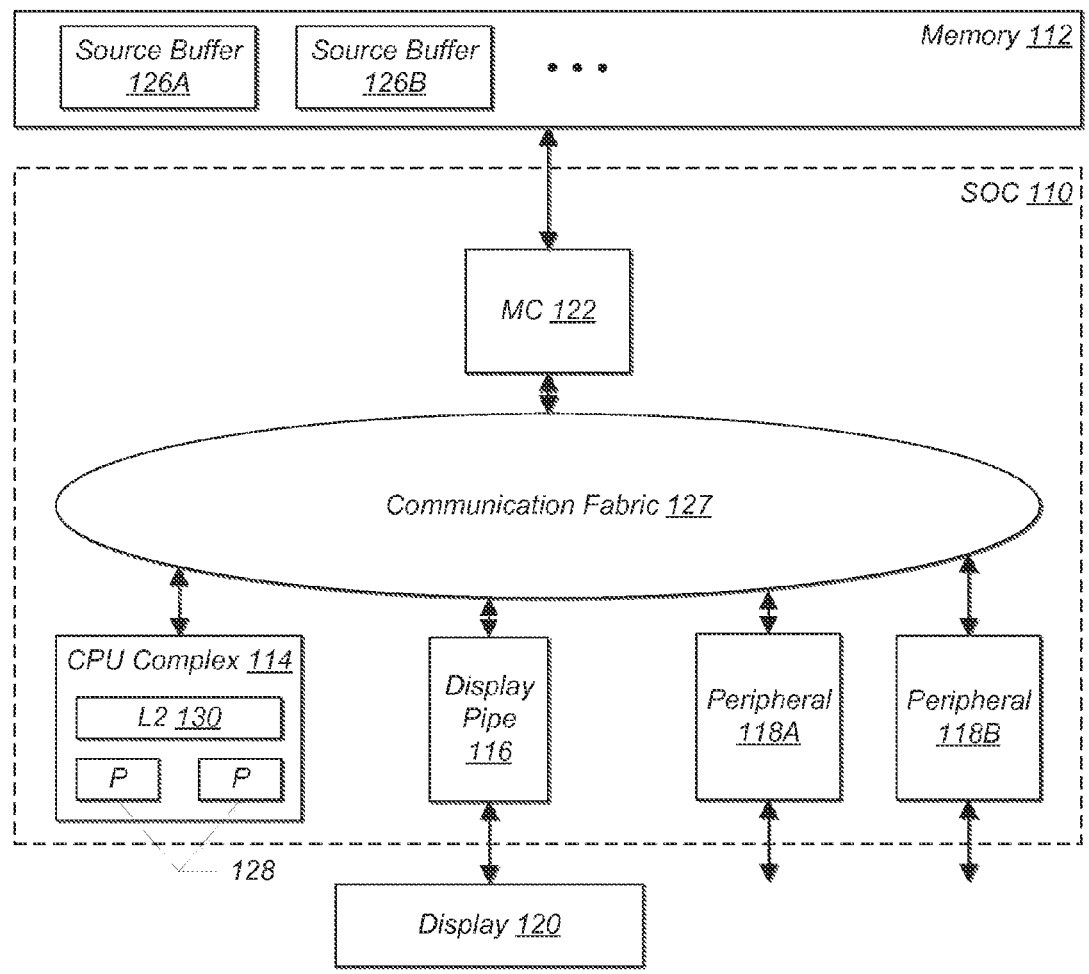
FIG. 1 is a block diagram illustrating one embodiment of a system on chip (SOC) coupled to a memory and one or more display devices.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a display pipeline . . . ." Such a claim does not foreclose the system from including additional components (e.g., a processor, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram of one embodiment of a system on chip (SOC) 110 is shown coupled to a memory 112 and display device 120. A display device may be more briefly referred to herein as a display. As implied by the name, the components of the SOC 110 may be integrated onto a single semiconductor substrate as an integrated circuit "chip." In some embodiments, the components may be implemented on two or more discrete chips in a system. However, the SOC 110 will be used as an example herein. In the illustrated embodiment, the components of the SOC 110 include a central processing unit (CPU) complex 114, display pipe 116, peripheral components 118A-118B (more briefly, "peripherals"), a memory controller 122, and a communication fabric 127. The components 114, 116, 118A-118B, and 122 may all be coupled to the communication fabric 127. The memory controller 122 may be coupled to the memory 112 during use. Similarly, the display pipe 116 may be coupled to the display 120 during use. In the illustrated embodiment, the CPU complex 114 includes one or more processors 128 and a level two (L2) cache 130.

The display pipe 116 may include hardware to process one or more still images and/or one or more video sequences for display on the display 120. Generally, for each source still image or video sequence, the display pipe 116 may be configured to generate read memory operations to read the data representing respective portions of the frame/video sequence from the memory 112 through the memory controller 122.

The display pipe 116 may be configured to perform any type of processing on the image data (still images, video sequences, etc.). In one embodiment, the display pipe 116 may be configured to scale still images and to dither, scale, and/or perform color space conversion on their respective portions of frames of a video sequence. The display pipe 116 may be configured to blend the still image frames and the video sequence frames to produce output frames for display. Display pipe 116 may also be more generally referred to as a display pipeline, display control unit, or a display controller. A display control unit may generally be any hardware configured to prepare a frame for display from one or more sources, such as still images and/or video sequences.

More particularly, display pipe 116 may be configured to retrieve respective portions of source frames from one or more source buffers 126A-126B stored in the memory 112, composite frames from the source buffers, and display the resulting frames on corresponding portions of the display 120. Source buffers 126A and 126B are representative of any number of source frame buffers which may be stored in memory 112. Accordingly, display pipe 116 may be configured to read the multiple source buffers 126A-126B and composite the image data to generate the output frame.

The display 120 may be any sort of visual display device. The display 120 may be a liquid crystal display (LCD), light emitting diode (LED), plasma, cathode ray tube (CRT), etc. The display 120 may be integrated into a system including the SOC 110 (e.g. a smart phone or tablet) and/or may be a separately housed device such as a computer monitor, television, or other device.

In some embodiments, the display 120 may be directly connected to the SOC 110 and may be controlled by the display pipe 116. That is, the display pipe 116 may include hardware (a "backend") that may provide various control/data signals to the display, including timing signals such as one or more clocks and/or the vertical blanking period and horizontal blanking interval controls. The clocks may include the pixel clock indicating that a pixel is being transmitted. The data signals may include color signals such as red, green, and blue, for example. The display pipe 116 may control the display 120 in real-time or near real-time, providing the data indicating the pixels to be displayed as the display is displaying the image indicated by the frame. The interface to such display 120 may be, for example, VGA, HDMI, digital video interface (DVI), a liquid crystal display (LCD) interface, a plasma interface, a cathode ray tube (CRT) interface, any proprietary display interface, etc.

Display pipeline 116 may be configured to change the frame refresh rate at which frames are driven to the display 120. For example, in one embodiment, display pipeline 116 may be configured to drive frames to the display 120 at a standard frame refresh rate while operating in a first mode, and display pipeline 116 may be configured to drive frames to the display 120 at a reduced frame refresh rate while operating in a second mode. In one embodiment, the standard frame refresh rate may be 60 frames per second (fps), while in other embodiments, the standard frame refresh rate may be any of various other fps values. The frame refresh rate may be expressed in terms of fps or hertz (Hz). In one embodiment, the reduced frame refresh rate may be 30 fps or another value which is divisible by 60 fps. In other words, the period of the reduced frame refresh rate may be a multiple of the period of the standard frame refresh rate in this embodiment. In other embodiments, the reduced frame refresh rate may be any of various other fps values. Additionally, in further embodiments, display pipeline 116 may utilize three or more different frame refresh rates at any of various fps values (e.g., 120 fps, 90 fps, 48 fps, 45 fps, 24 fps).

While operating at the reduced frame refresh rate, display pipeline 116 may utilize less power as compared to operating at the standard frame refresh rate, thereby increasing the battery life of the host device of SOC 110. However, certain events may take place which may cause display pipeline 116 to switch from reduced frame refresh rate to the standard frame refresh rate. For example, if a touch event is detected on display 120 while display pipeline 116 is operating at the reduced frame refresh rate, then display pipeline 116 may be configured to increase the frame refresh rate.

The CPU complex 114 may include one or more CPU processors 128 that serve as the CPU of the SOC 110. The CPU of the system includes the processor(s) that execute the main control software of the system, such as an operating system. Generally, software executed by the CPU during use may control the other components of the system to realize the desired functionality of the system. The CPU processors 128 may also execute other software, such as application programs. The application programs may provide user functionality, and may rely on the operating system for lower level device control. Accordingly, the CPU processors 128 may also be referred to as application processors. The CPU complex may further include other hardware such as the L2 cache 130 and/or an interface to the other components of the system (e.g., an interface to the communication fabric 127).

The peripherals 118A-118B may be any set of additional hardware functionality included in the SOC 110. For example, the peripherals 118A-118B may include video peripherals such as video encoder/decoders, image signal processors for image sensor data such as camera, scalers, rotators, blenders, graphics processing units, etc. The peripherals 118A-118B may include audio peripherals such as microphones, speakers, interfaces to microphones and speakers, audio processors, digital signal processors, mixers, etc. The peripherals 118A-118B may include interface controllers for various interfaces external to the SOC 110 including interfaces such as Universal Serial Bus (USB), peripheral component interconnect (PCI) including PCI Express (PCIe), serial and parallel ports, etc. The peripherals 118A-118B may include networking peripherals such as media access controllers (MACs). Any set of hardware may be included.

The memory controller 122 may generally include the circuitry for receiving memory operations from the other components of the SOC 110 and for accessing the memory 112 to complete the memory operations. The memory controller 122 may be configured to access any type of memory 112. For example, the memory 112 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 122 may include various queues for buffering memory operations, data for the operations, etc., and the circuitry to sequence the operations and access the memory 112 according to the interface defined for the memory 112.

The communication fabric 127 may be any communication interconnect and protocol for communicating among the components of the SOC 110. The communication fabric 127 may be bus-based, including shared bus configurations, cross bar configurations, and hierarchical buses with bridges. The communication fabric 127 may also be packet-based, and may be hierarchical with bridges, cross bar, point-to-point, or other interconnects.

It is noted that the number of components of the SOC 110 (and the number of subcomponents for those shown in FIG. 1, such as within the CPU complex 114) may vary from embodiment to embodiment. There may be more or fewer of each component/subcomponent than the number shown in FIG. 1. It is also noted that SOC 110 may include many other components not shown in FIG. 1. In various embodiments, SOC 110 may also be referred to as an integrated circuit (IC), an application specific integrated circuit (ASIC), or an apparatus.

Figure 2:
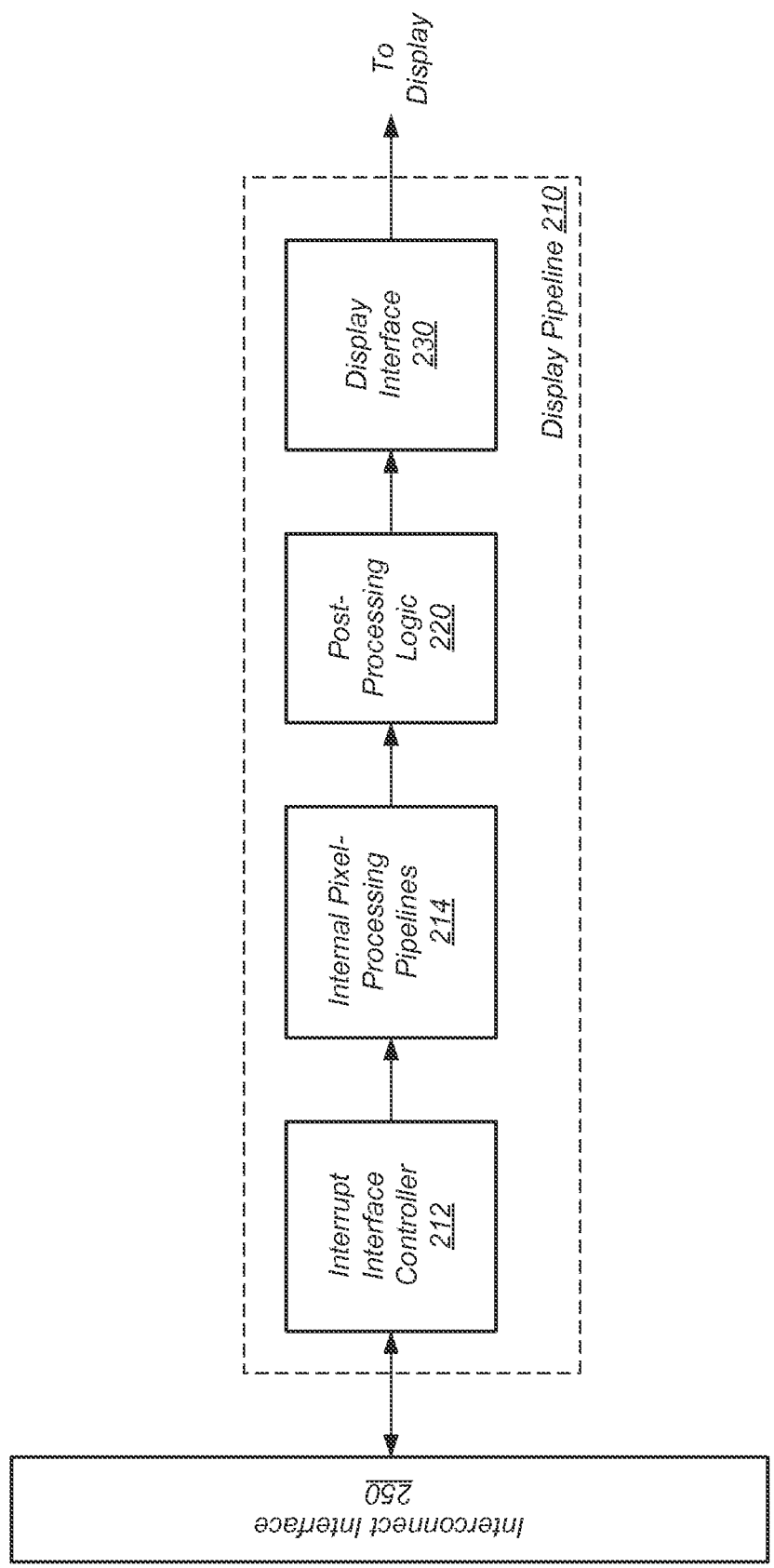
FIG. 2 is a block diagram of one embodiment of a display pipeline for use in a SOC.

Turning now to FIG. 2, a generalized block diagram of one embodiment of a display pipeline for use in a SoC is shown. Although one display pipeline is shown, in other embodiments, the host SOC (e.g., SOC 110) may include multiple display pipelines. Generally speaking, display pipeline 210 may be configured to process a source image and send rendered graphical information to a display (not shown).

Display pipeline 210 may be coupled to interconnect interface 250 which may include multiplexers and control logic for routing signals and packets between the display pipeline 210 and a top-level fabric. The interconnect interface 250 may correspond to communication fabric 127 of FIG. 1. Display pipeline 210 may include interrupt interface controller 212. Interrupt interface controller 212 may include logic to expand a number of sources or external devices to generate interrupts to be presented to the internal pixel-processing pipelines 214. The controller 212 may provide encoding schemes, registers for storing interrupt vector addresses, and control logic for checking, enabling, and acknowledging interrupts. The number of interrupts and a selected protocol may be configurable.

Display pipeline 210 may include one or more internal pixel-processing pipelines 214. The internal pixel-processing pipelines 214 may include one or more ARGB (Alpha, Red, Green, Blue) pipelines for processing and displaying user interface (UI) layers. The internal pixel-processing pipelines 214 may also include one or more pipelines for processing and displaying video content such as YUV content. In some embodiments, internal pixel-processing pipelines 214 may include blending circuitry for blending graphical information before sending the information as output to post-processing logic 220.

A layer may refer to a presentation layer. A presentation layer may consist of multiple software components used to define one or more images to present to a user. The UI layer may include components for at least managing visual layouts and styles and organizing browses, searches, and displayed data. The presentation layer may interact with process components for orchestrating user interactions and also with the business or application layer and the data access layer to form an overall solution. The YUV content is a type of video signal that consists of one signal for luminance or brightness and two other signals for chrominance or colors. The YUV content may replace the traditional composite video signal. For example, the MPEG-2 encoding system in the DVD format uses YUV content. The internal pixel-processing pipelines 214 may handle the rendering of the YUV content.

The display pipeline 210 may include post-processing logic 220. The post-processing logic 220 may be used for color management, ambient-adaptive pixel (AAP) modification, dynamic backlight control (DPB), panel gamma correction, and dither. The display interface 230 may handle the protocol for communicating with the display. For example, in one embodiment, a DisplayPort interface may be used. Alternatively, the Mobile Industry Processor Interface (MIPI) Display Serial Interface (DSI) specification or a 4-lane Embedded Display Port (eDP) specification may be used. It is noted that the post-processing logic and display interface may be referred to as the display backend.

Figure 3:
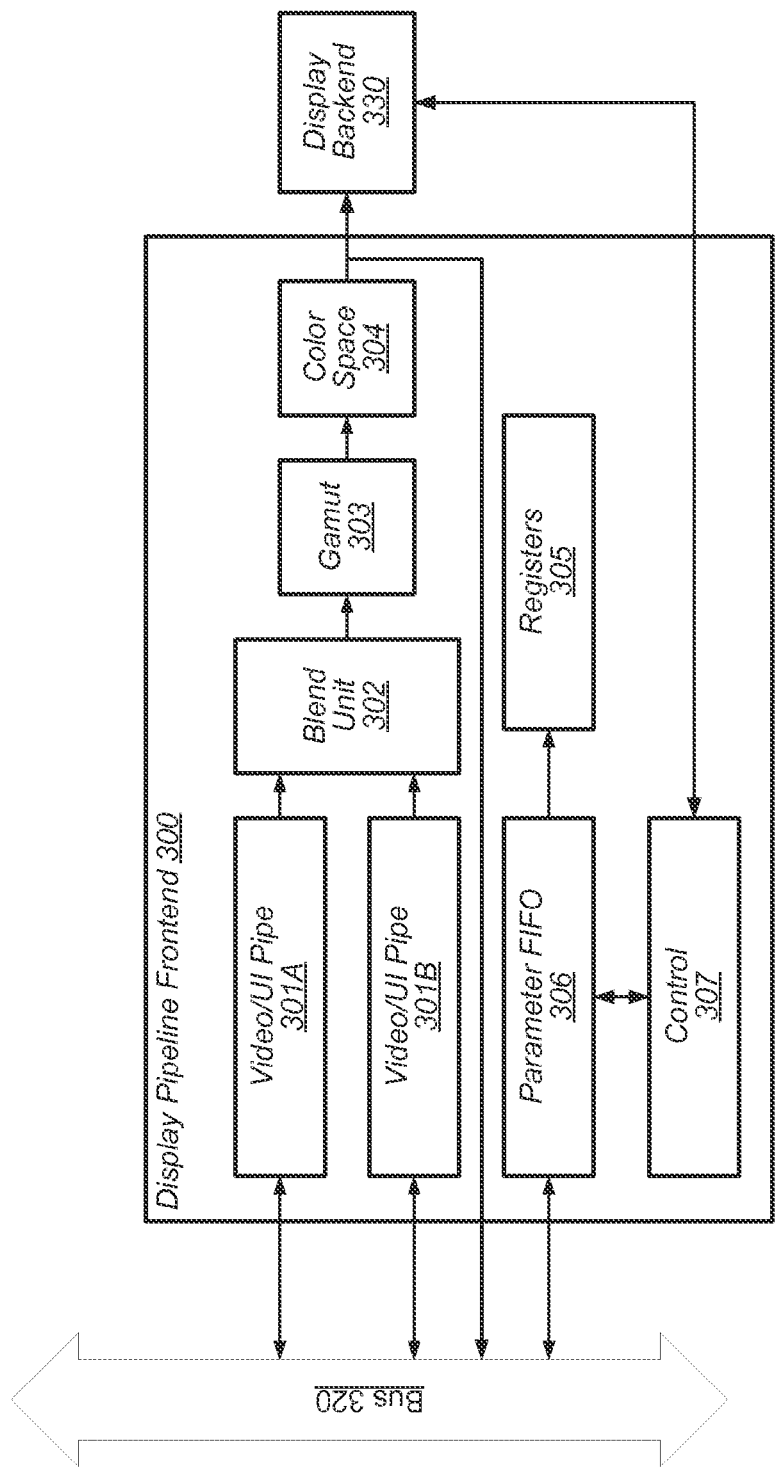
FIG. 3 is a block diagram illustrating one embodiment of a display pipeline frontend.

Referring now to FIG. 3, a block diagram of one embodiment of a display pipeline frontend 300 is shown. Display pipeline frontend 300 may represent the frontend portion of display pipe 116 of FIG. 1. Display pipeline frontend 300 may be coupled to a system bus 320 and to a display backend 330. In some embodiments, display backend 330 may directly interface to the display to display pixels generated by display pipeline frontend 300. Display pipeline frontend 300 may include functional sub-blocks such as one or more video/user interface (UI) pipelines 301A-B, blend unit 302, gamut adjustment block 303, color space converter 304, registers 305, parameter First-In First-Out buffer (FIFO) 306, and control unit 307. Display pipeline frontend 300 may also include other components which are not shown in FIG. 3 to avoid cluttering the figure.

System bus 320, in some embodiments, may correspond to communication fabric 127 from FIG. 1. System bus 320 couples various functional blocks such that the functional blocks may pass data between one another. Display pipeline frontend 300 may be coupled to system bus 320 in order to receive video frame data for processing. In some embodiments, display pipeline frontend 300 may also send processed video frames to other functional blocks and/or memory that may also be coupled to system bus 320. It is to be understood that when the term "video frame" is used, this is intended to represent any type of frame, such as an image, that can be rendered to the display.

The display pipeline frontend 300 may include one or more video/UI pipelines 301A-B, each of which may be a video and/or user interface (UI) pipeline depending on the embodiment. It is noted that the terms "video/UI pipeline" and "pixel processing pipeline" may be used interchangeably herein. In other embodiments, display pipeline frontend 300 may have one or more dedicated video pipelines and/or one or more dedicated UI pipelines. Each video/UI pipeline 301 may fetch a source image (or a portion of a source image) from a buffer coupled to system bus 320. The buffered source image may reside in a system memory such as, for example, system memory 112 from FIG. 1. Each video/UI pipeline 301 may fetch a distinct source image (or a portion of a distinct source image) and may process the source image in various ways, including, but not limited to, format conversion (e.g., YCbCr to ARGB), image scaling, and dithering. In some embodiments, each video/UI pipeline may process one pixel at a time, in a specific order from the source image, outputting a stream of pixel data, and maintaining the same order as pixel data passes through.

In one embodiment, when utilized as a user interface pipeline, a given video/UI pipeline 301 may support programmable active regions in the source image. The active regions may define the only portions of the source image to be displayed. In an embodiment, the given video/UI pipeline 301 may be configured to only fetch data within the active regions. Outside of the active regions, dummy data with an alpha value of zero may be passed as the pixel data.

Control unit 307 may, in various embodiments, be configured to arbitrate read requests to fetch data from memory from video/UI pipelines 301A-B. In some embodiments, the read requests may point to a virtual address. A memory management unit (not shown) may convert the virtual address to a physical address in memory prior to the requests being presented to the memory. In some embodiments, control unit 307 may include a dedicated state machine or sequential logic circuit. A general purpose processor executing program instructions stored in memory may, in other embodiments, be employed to perform the functions of control unit 307.

Blending unit 302 may receive a pixel stream from one or more of video/UI pipelines 301A-B. If only one pixel stream is received, blending unit 302 may simply pass the stream through to the next sub-block. However, if more than one pixel stream is received, blending unit 302 may blend the pixel colors together to create an image to be displayed. In various embodiments, blending unit 302 may be used to transition from one image to another or to display a notification window on top of an active application window. For example, a top layer video frame for a notification, such as, for a calendar reminder, may need to appear on top of, i.e., as a primary element in the display, despite a different application, an internet browser window for example. The calendar reminder may comprise some transparent or semi-transparent elements in which the browser window may be at least partially visible, which may require blending unit 302 to adjust the appearance of the browser window based on the color and transparency of the calendar reminder. The output of blending unit 302 may be a single pixel stream composite of the one or more input pixel streams.

The output of blending unit 302 may be sent to gamut adjustment unit 303. Gamut adjustment 303 may adjust the color mapping of the output of blending unit 302 to better match the available color of the intended target display. The output of gamut adjustment unit 303 may be sent to color space converter 304. Color space converter 304 may take the pixel stream output from gamut adjustment unit 303 and convert it to a new color space. Color space converter 304 may then send the pixel stream to display backend 330 or back onto system bus 320. In other embodiments, the pixel stream may be sent to other target destinations. For example, the pixel stream may be sent to a network interface for example. In some embodiments, a new color space may be chosen based on the mix of colors after blending and gamut corrections have been applied. In further embodiments, the color space may be changed based on the intended target display.

Display backend 330 may control the display to display the pixels generated by display pipeline frontend 300. Display backend 330 may read pixels at a regular rate from an output FIFO (not shown) of display pipeline frontend 300 according to a pixel clock. The rate may depend on the resolution of the display as well as the refresh rate of the display. For example, a display having a resolution of N×M and a refresh rate of R fps may have a pixel clock frequency based on N×M×R. On the other hand, the output FIFO may be written to as pixels are generated by display pipeline frontend 300.

Display backend 330 may receive processed image data as each pixel is processed by display pipeline frontend 300. Display backend 330 may provide final processing to the image data before each video frame is displayed. In some embodiments, display back end may include ambient-adaptive pixel (AAP) modification, dynamic backlight control (DPB), display panel gamma correction, and dithering specific to an electronic display coupled to display backend 330.

The parameters that display pipeline frontend 300 may use to control how the various sub-blocks manipulate the video frame may be stored in control registers 305. These registers may include, but are not limited to, setting the frame refresh rate, setting input and output frame sizes, setting input and output pixel formats, location of the source frames, and destination of the output (display backend 330 or system bus 320). Control registers 305 may be loaded by parameter FIFO 306.

Parameter FIFO 306 may be loaded by a host processor, a direct memory access unit, a graphics processing unit, or any other suitable processor within the computing system. In other embodiments, parameter FIFO 306 may directly fetch values from a system memory, such as, for example, system memory 112 in FIG. 1. Parameter FIFO 306 may be configured to update control registers 305 of display processor 300 before each source video frame is fetched. In some embodiments, parameter FIFO may update all control registers 305 for each frame. In other embodiments, parameter FIFO may be configured to update subsets of control registers 305 including all or none for each frame. A FIFO as used and described herein, may refer to a memory storage buffer in which data stored in the buffer is read in the same order it was written. A FIFO may be comprised of RAM or registers and may utilize pointers to the first and last entries in the FIFO.

It is noted that the display pipeline frontend 300 illustrated in FIG. 3 is merely an example. In other embodiments, different functional blocks and different configurations of functional blocks may be possible depending on the specific application for which the display pipeline is intended. For example, more than two video/UI pipelines may be included within a display pipeline frontend in other embodiments.

Figure 4:
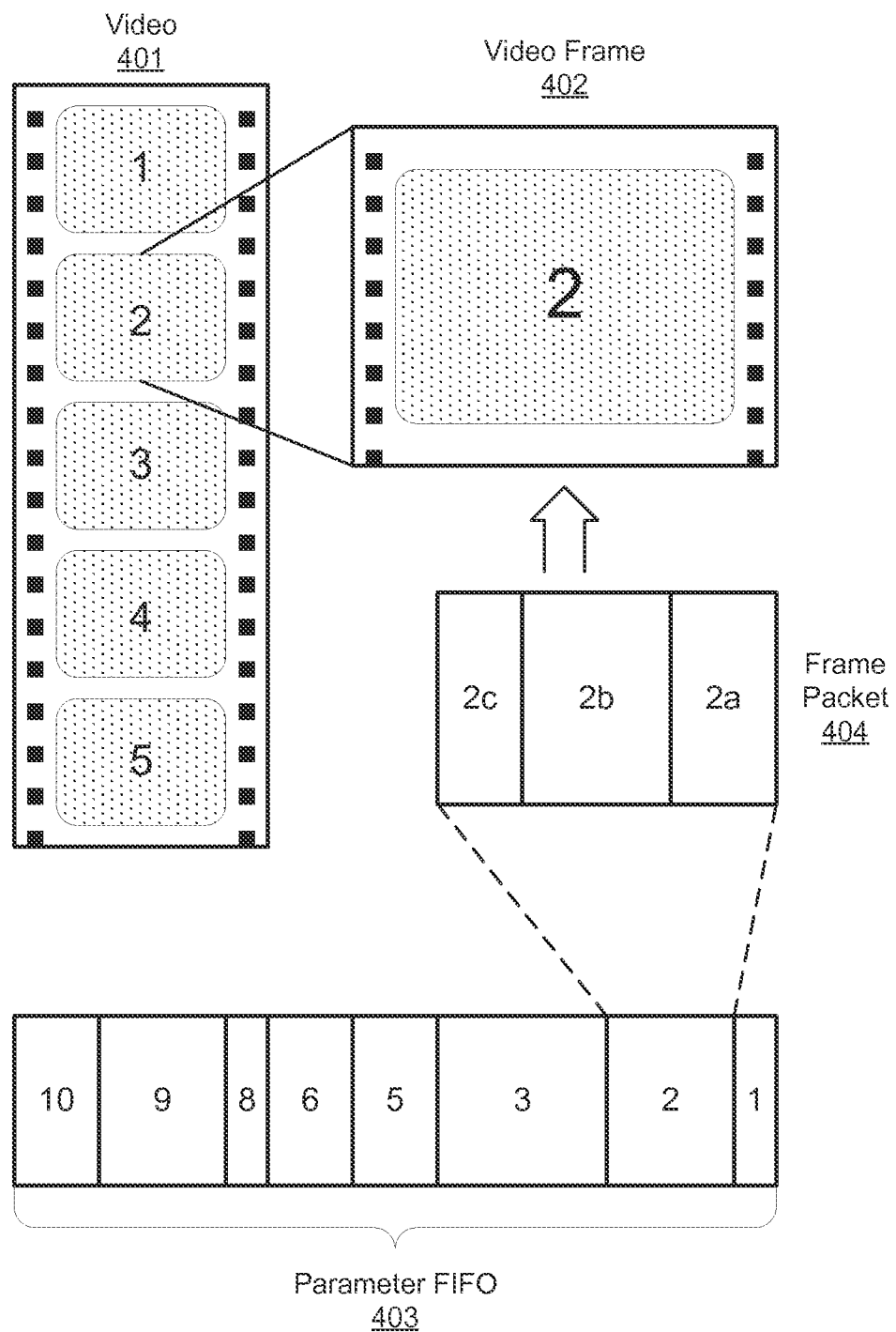
FIG. 4 is a block diagram illustrating one embodiment of a representation of a video file and a corresponding parameter FIFO.

Turning now to FIG. 4, a representation of a video file and a corresponding parameter FIFO are shown. In various embodiments, video 401 may represent a file containing a video clip in a format, such as, for example, Moving Pictures Expert Group-4 Part 14 (MP4), Advanced Video Coding (H.264/AVC), High Efficiency Video Coding (H.265/HEVC), or Audio Video Interleave (AVI). Alternatively, Video 401 may be a series of still images, each image considered a frame, that may be displayed in timed intervals, commonly referred to as a slideshow. The images may be in a format such as Joint Photographic Experts Group (JPEG), raw image format (RAW), Graphics Interchange Format (GIF), or Portable Networks Graphics (PNG). For demonstration purposes, Video 401 is illustrated with five frames, numbered 1 through 5. However, any number of frames may be included in Video 401.

Video frame 402 may represent a single frame from video 401. In this example, video frame 402 is illustrated as frame number 2 of video 401. Video frame 402 may be a single image, in any of the formats previously discussed or any other suitable format. Video frame 402 may contain a list of pixel information in ARGB, YCbCr, or other suitable pixel format.

Parameter FIFO 403 may correspond to parameter FIFO 306 as illustrated in FIG. 3 and may have functionality as previously described. For demonstration purposes, parameter FIFO 403 is illustrated in FIG. 4 as holding eight frame packets, numbered 1 through 10, with 4 and 7 excluded. However, parameter FIFO 403 may hold as many frame packets as allowed by the size of the FIFO and the size of the frame packets. The number of the frame packet may correspond to the number of the video frame of video 401 for which the packet is intended to be used. Frame packets 4 and 7 (not shown) are excluded to illustrate that some video frames may not require a frame packet. In other embodiments, a frame packet may be required for each video frame. The size of each of the frame packets is shown to vary among the 10 examples to illustrate that the sizes may differ from frame packet to frame packet. In other embodiments, each frame packet may be a standard consistent size.

Frame packet 404 may represent a single frame packet stored in Parameter FIFO 403. Frame packet 404 may contain settings for various registers associated with a given video frame. In this example, frame packet 404 is shown as number 2 which may correspond to video frame 402, also illustrated as number 2. Frame packet 404 is illustrated as being divided into three sections, labeled 2a, 2b, and 2c, each representing one parameter command. A given frame packet may include any number of parameter commands, from zero to as many as may be stored in parameter FIFO 403. Each parameter command 2a-2c may contain a setting for one or more registers associated with video frame 402. Parameter commands 2a-2c may be of various lengths, based on the number of settings included in each command. In other embodiments, parameter commands 2a-2c may be standardized to one or more specific lengths.

In a system such as SOC 110 in FIG. 1, display pipe 116 may process respective portions of video frame 402 and frame packet 404 such that parameter commands 2a-2c are executed after video frame 1 of video 401 has been displayed and before video frame 402, is displayed, such that video frame 402 is displayed with parameters corresponding to parameter commands 2a-2c. These parameters may remain at their set values until another parameter command is executed that changes their currently set value. In some embodiments, the values of some or all parameters may be modified by commands not associated with parameter FIFO 403, such as, for example, operations transmitted by processor 114 of FIG. 1.

Figure 5:
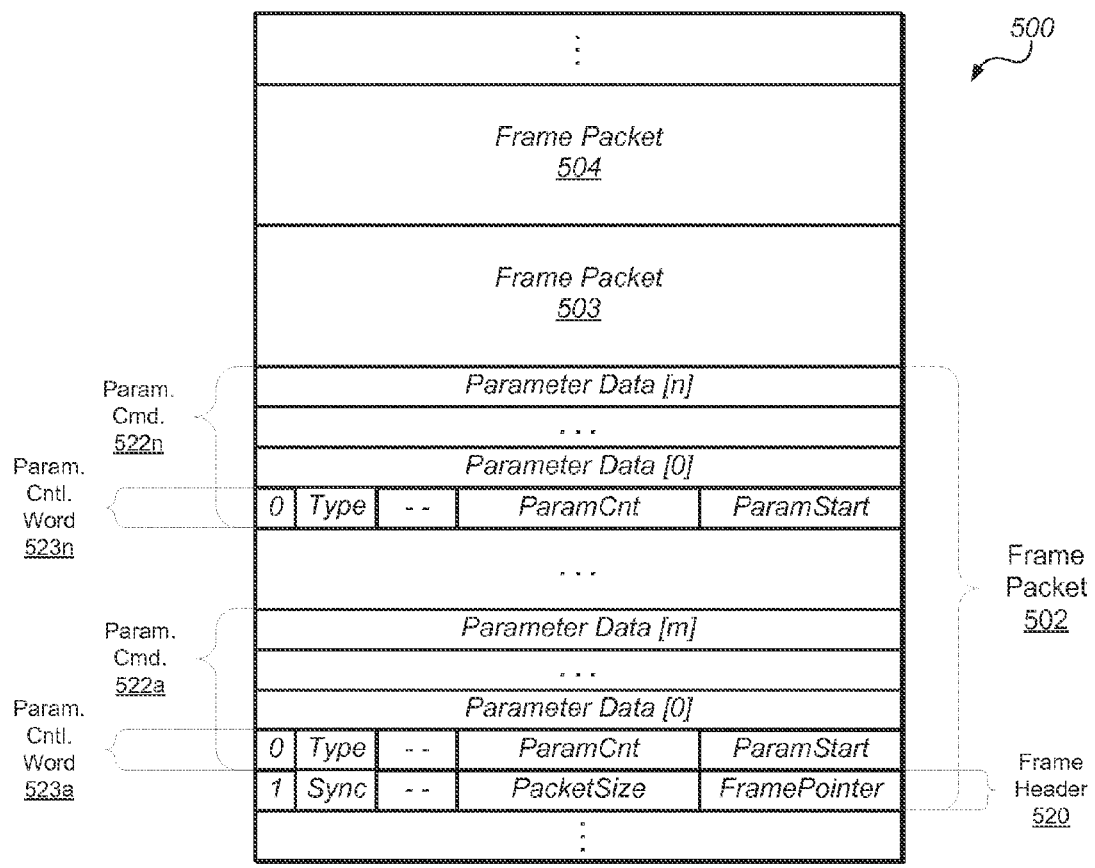
FIG. 5 is a block diagram illustrating one embodiment of parameter FIFO entries.

Referring now to FIG. 5, one embodiment of parameter FIFO entries 500 are shown. FIG. 5 illustrates the entries in a parameter FIFO, such as parameter FIFO 403 in FIG. 4. Parameter FIFO entries 500 may include several frame packets, as illustrated by frame packets 502, 503, and 504.

Frame packet 502 may, in some embodiments, include frame header 520 and be followed by a number of parameter commands, such as parameter command 522a through parameter command 522n as depicted in FIG. 5. A given frame packet may contain zero parameter commands up to the maximum number of commands that may fit into a FIFO of a given size. A frame packet with zero parameter commands may be referred to as a null parameter setting. Frame packet 502 may be read from parameter FIFO 403 when all frame packets written to parameter FIFO 403 before frame packet 502 have been read. When frame packet 502 is read, the first word read may be frame header 520.

Frame header 520 may contain information regarding the structure of frame packet 502. For example, frame header 520 may include a value corresponding to the size of frame packet 502. In some embodiments, the size may represent the number of bytes or words in the frame packet 502 and, in other embodiments, the size may represent the number of parameter commands. Frame header 520 may also include a value corresponding to the video frame for which it is intended. In various embodiments, frame header 520 may include a value to indicate that it is a frame header and/or a value to indicate frame packet 502 should be used with the next video frame to be processed rather than a specific video frame. This last feature may be useful in cases where a user adjusts a setting while a video is playing or an image is being displayed. For example, a user may change a brightness setting or a zoom factor with an expectation of the change being implemented as soon as possible rather than at a specific video frame.

Frame packet 502 may include zero or more parameter commands 522a-n. In some embodiments, a given parameter command, such as, for example, parameter command 522a, may include one parameter control word 523a. The parameter control word may define the structure of parameter command 522a. For example, parameter control word 523a may include a parameter count value to indicate how many parameter settings are included in the command. Parameter control word 523a may also include a parameter start value to indicate a starting register address for the parameter settings to be written. Some embodiments may also include a type value to indicate if parameter command 522a is internal, i.e., intended for registers within the display pipeline, such as display pipeline 116, or external, i.e., intended for registers outside display pipeline 116. In some embodiments, the parameter start value may only be used for internal parameter commands, where the registers may be addressed with an address value smaller than a complete data word. In such embodiments, external commands may use the first one or more words of the parameter data to form a starting address for the register(s) to be written with the remaining parameter data.

Each parameter setting within parameter command 522a may include one or more words of parameter data, shown in FIG. 5 as parameter data [0] through parameter data [m]. The number of parameter data words included in parameter command 522a may depend on the type of parameter command, internal or external, and the number of registers to be written by parameter command 522a. In various embodiments, parameter commands 522 may include various numbers of parameter data or may be standardized to a specific number of parameter data.

It is noted that the descriptions of frame packets, video frames and the parameter FIFO in FIG. 4 and FIG. 5 are merely examples. In other embodiments, the structure of a frame packet may include multiple words for header rather than the single word illustrated in FIG. 5, and a header may not be the first word within a given frame packet. In various embodiments, frame packets and parameter commands may be of a fixed length rather than various lengths as illustrated in FIGS. 4 and 5.

Figure 6:
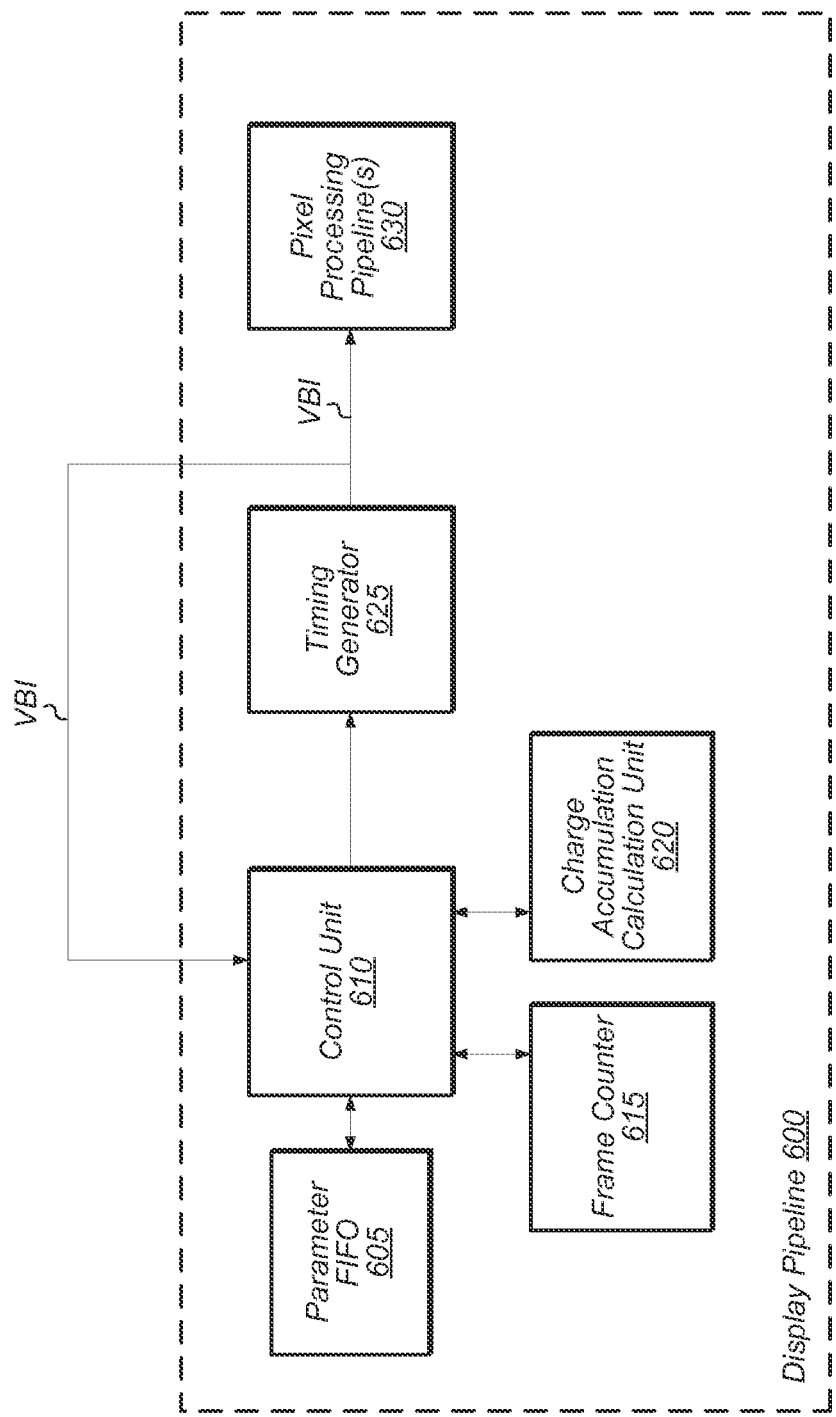
FIG. 6 is a block diagram illustrating another embodiment of a display pipeline.

Referring to FIG. 6, a block diagram of another embodiment of a display pipeline 600 is shown. Display pipeline 600 may include parameter FIFO 605, control unit 610, frame counter 615, charge accumulation calculation unit 620, timing generator 625, and pixel processing pipeline(s) 630. It should be understood that display pipeline 600 may include additional logic which is not shown to avoid obscuring the figure.

Frame counter 615 may be configured to monitor a number of frames being displayed at the current frame refresh rate. Alternatively, control unit 610 may be configured to track a frame number of a frame being displayed. For example, control unit 610 may track whether the first frame being displayed at a first frame refresh rate is odd or even, and then before switching to a different frame refresh rate, control unit 610 may check the frame number of the last frame displayed to determine if the total number of frames displayed at the first frame refresh rate is odd or even. In one embodiment, control unit 610 may be configured to force a number of frames being displayed at a first frame refresh rate to be an even number responsive to determining the frame refresh rate is being changed to a second frame refresh rate, wherein the second frame refresh rate is different from the first frame refresh rate. In some cases, control unit 610 may only be configured to force an even number of frames to be displayed at the first frame refresh rate if the second frame refresh rate is lower than the first frame refresh rate.

In another embodiment, control unit 610 may be coupled to charge accumulation calculation unit 620 which may be configured to track if a charge accumulation is building up on the display panel. Charge accumulation calculation unit 620 may be configured to keep a running total of the amount of charge accumulating on the display. Charge accumulation calculation unit 620 may monitor the frame refresh rate setting and polarity of the display panel for each frame being displayed. In one embodiment, charge accumulation calculation unit 620 may multiply the inverse of the frame refresh rate for a frame by the polarity of the frame and maintain a running total of this value for the sequence of frames being displayed. If the charge accumulation exceeds a threshold, then charge accumulation calculation unit 620 may notify control unit 610. In response to receiving this notification, control unit 610 may alter the frame refresh rate pattern of future frames being displayed to reduce the charge accumulation.

Timing generator 625 may be configured to generate the vertical blanking interval (VBI) signal at the frame refresh rate specified by control unit 610. Timing generator 625 may convey the generated VBI signal to control unit 610, pixel processing pipeline(s) 630, and one or more other logical units.

Figure 7:
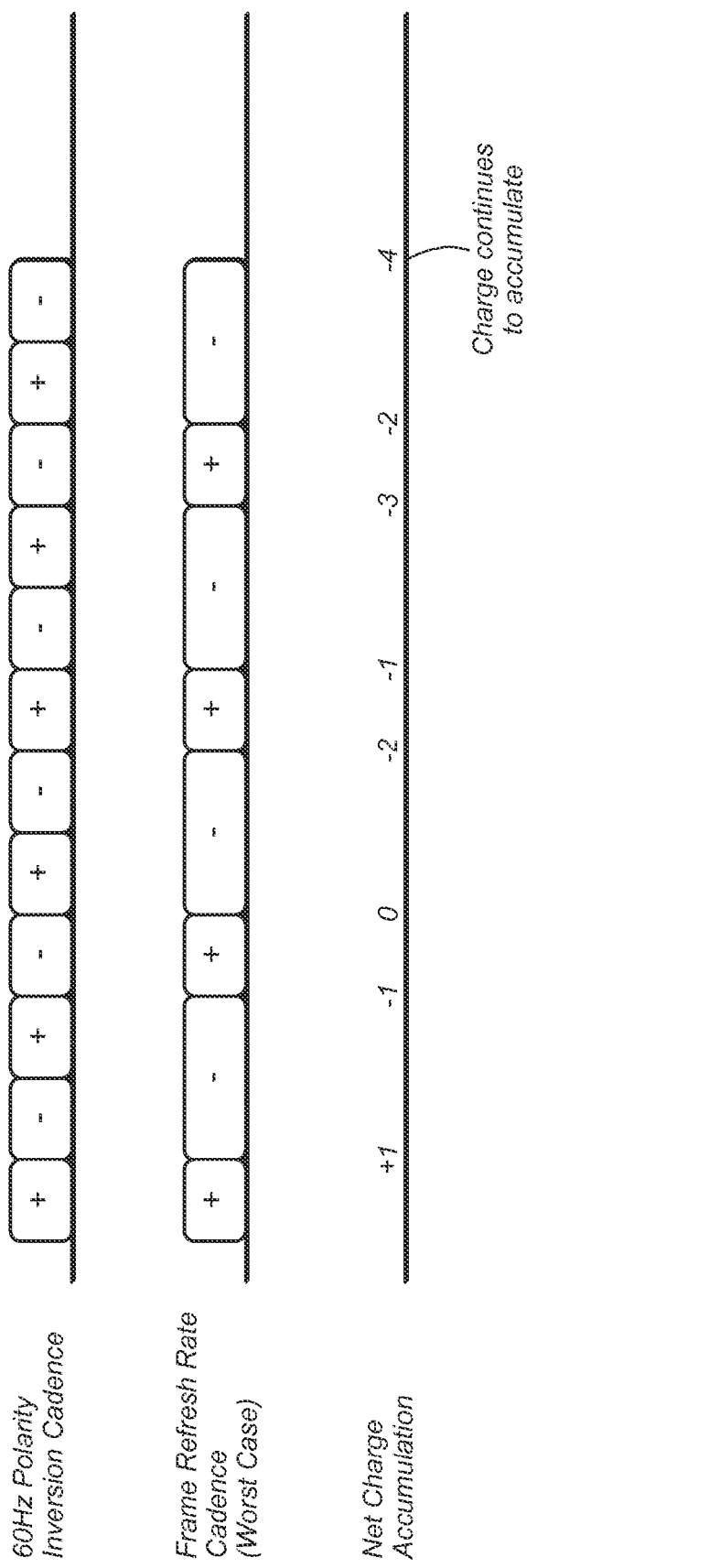
FIG. 7 is a timing diagram of one embodiment of a polarity inversion cadence and worst case frame refresh rate cadence.

Referring now to FIG. 7, a timing diagram of one embodiment of a polarity inversion cadence and worst case frame refresh rate cadence are shown. The polarity inversion cadence is shown as a 60 Hz rate, with the polarity alternating between positive and negative on consecutive cycles. The frame refresh rate cadence is an example of a worst case scenario that would generate a charge accumulation on the display panel which grows with time. The net charge accumulation is shown underneath the frame refresh rate cadence.

The frame refresh rate cadence alternates between one frame at 60 Hz followed by one frame at 30 Hz, with this pattern repeating indefinitely. For this type of pattern, the charge accumulation will develop and grow since the 30 Hz frame is twice as long as the 60 Hz frame and each 30 Hz frame coincides with a negative polarity. In some embodiments, the display pipeline may include logic (e.g., charge accumulation calculation unit 620) which calculates the net charge accumulation of the display panel based on the polarity inversion cadence and the frame refresh rate cadence. This logic may calculate the amount of time of a given frame by performing the inverse of the frame refresh rate and then multiplying the time by the current polarity. This logic may then include an accumulator to add the time multiplied by the current polarity for a plurality of frames to track the net charge accumulation over time. This logic may allow the display unit to alter the frame refresh rate pattern in order to reduce the net charge accumulation in response to detecting the net charge accumulation has exceeded a threshold.

In another embodiment, the display unit may be coupled to a charge accumulation sensor which is coupled to the display panel. The charge accumulation sensor may be configured to detect the charge accumulation which has built up on the display panel. In this embodiment, the display unit may implement any of various techniques for reducing the net charge accumulation in response to detecting that the sensor has sensed that the net charge accumulation on the display panel has exceeded a threshold. The threshold may be programmable and may vary from embodiment to embodiment.

It is noted that the worse case pattern shown in FIG. 7 is merely one example of a frame refresh rate pattern that can cause a large charge accumulation on the display panel. In other embodiments, other patterns of frame refresh rates may be utilized for sequences of frames, and these patterns may also generate a large charge accumulation.

Figure 8:
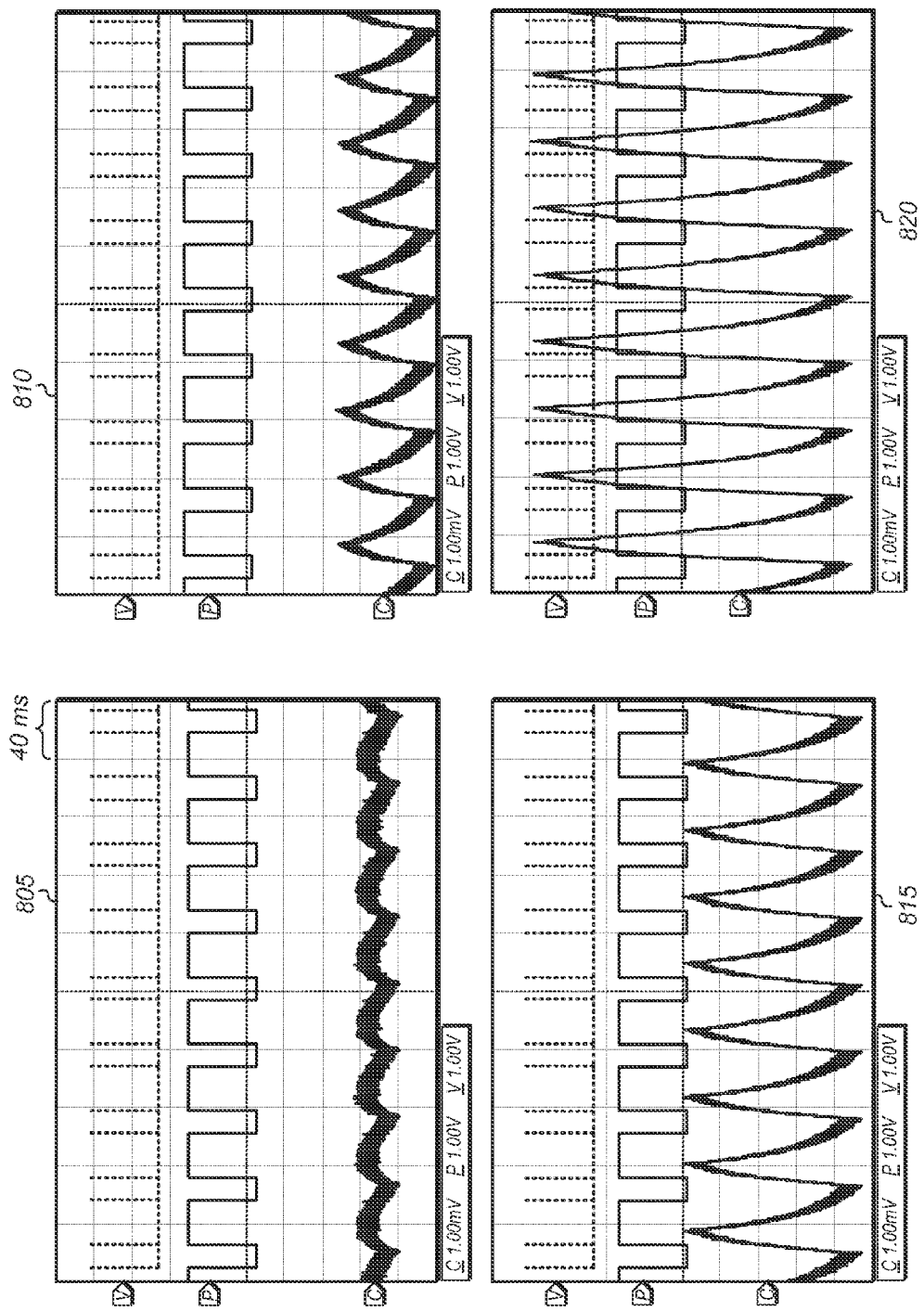
FIG. 8 illustrates four waveform diagrams of charge accumulation for a worst case scenario.

Turning now to FIG. 8, four waveform diagrams of charge accumulation for a worst case scenario are shown. The polarity inversion (or 'P') waveform in diagram 805 shows the polarity alternating between positive and negative for successive frames. The voltage waveform (or 'V') in diagram 805 shows the frame boundaries between successive frames. The voltage waveform also indicates the frame refresh rate, which can be determined by calculating the inverse of the frame period. Each grid section of the diagram is 40 milliseconds (ms) as shown in diagram 805. Accordingly, the frame refresh rate is alternating back and forth from 30 Hz to 60 Hz. This causes each 30 Hz frame to always coincide with the positive polarity of the polarity inversion waveform used to drive the display panel, which results in a net charge accumulation developing on the display panel. The charge accumulation waveform (or 'C') is shown at the bottom of diagram 805. The polarity and voltage waveforms have a 1 volt (V) grid section setting while the charge accumulation waveform has a 1 millivolt (mV) setting.

Diagram 810 is a continuation of the scenario shown in diagram 805. The voltage waveform and polarity inversion waveform patterns are the same in diagram 810 as in diagram 805. Diagram 810 shows the charge accumulation waveform at a later point in time as the charge accumulation increases. This is indicated by the larger swings in voltage for the charge accumulation waveform at the bottom of diagram 810.

Diagrams 815 and 820 continue the same scenario which is shown in diagrams 805 and 810. The charge accumulation waveform is shown growing larger in diagram 815 and continuing to grow larger in diagram 820. It is noted that the frame refresh rate boundary patterns and polarity inversion patterns shown in the diagrams 805, 810, 815, and 820 are a worst-case charge accumulation scenario for a scenario with 30 Hz and 60 Hz frame refresh rates. However, other frame refresh rate boundary patterns and polarity inversion patterns may also cause a charge accumulation on the display panel, albeit with the charge accumulation increasing at a slower rate than the worst case scenario.

Figure 9:
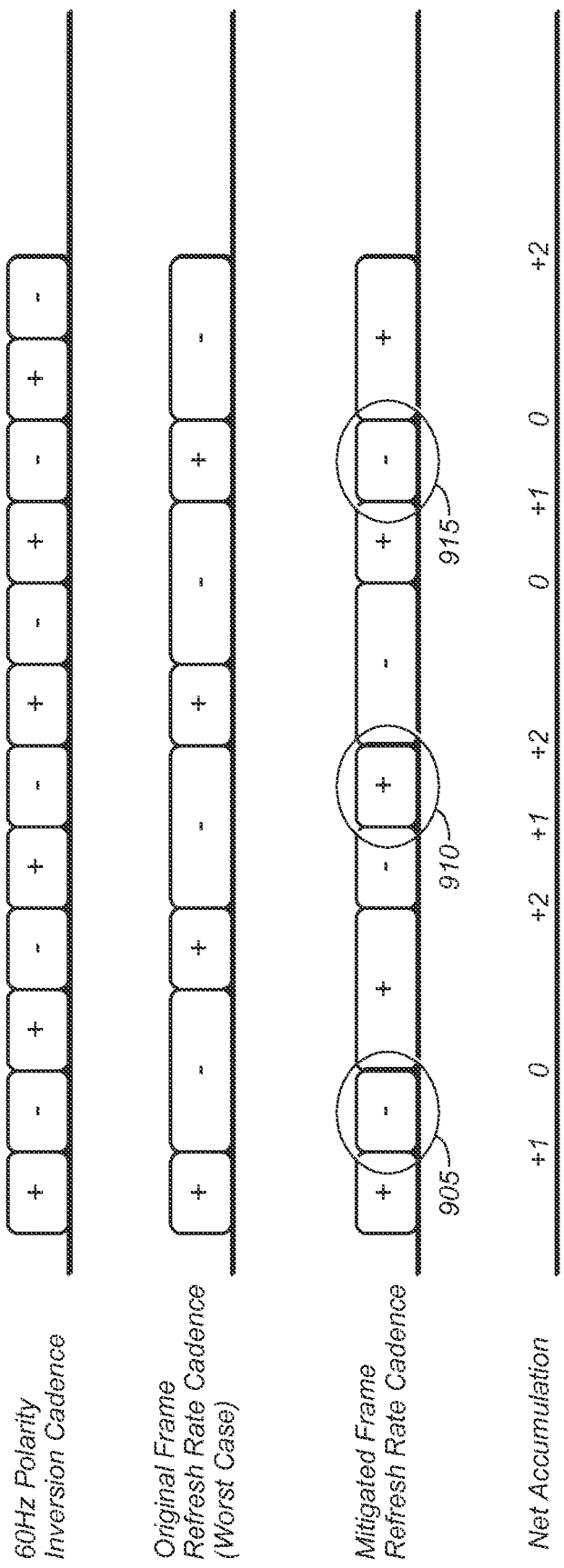
FIG. 9 is a timing diagram of one embodiment of a polarity inversion cadence and frame refresh rate cadences.

Referring now to FIG. 9, a timing diagram of one embodiment of a polarity inversion cadence and frame refresh rate cadences are shown. The polarity inversion of 60 Hz is shown at the top of FIG. 9. This polarity inversion is used to invert the polarity for each new frame being displayed. However, if this polarity inversion is utilized for the original frame refresh rate cadence, which is a worst case scenario, then a charge accumulation will occur on the display panel. Therefore, the mitigated frame refresh rate cadence may be utilized as shown as the third (or bottom) waveform of FIG. 9.

The mitigated frame refresh rate cadence may be generated by requiring an even number of frames at the 60 Hz frame refresh rate before the frame refresh rate is changed to 30 Hz. Accordingly, frame 905 is displayed at a 60 Hz frame refresh rate before the frame refresh rate is switched to 30 Hz. Similarly, frame 910 is displayed at the 60 Hz frame refresh rate so that there are two consecutive frames at the 60 Hz frame refresh rate before the 30 Hz frame refresh rate is utilized. Also, frame 915 is displayed at the 60 Hz frame refresh rate to make two back-to-back frames at 60 Hz prior to switching to the 30 Hz frame refresh rate.

The net charge accumulation is shown at the bottom of FIG. 9, which shows that the net charge accumulation never exceeds a net value of +2. The mitigated frame refresh rate cadence is one approach for preventing a charge accumulation from occurring on the display panel for an original frame refresh rate cadence such as the one shown in the middle of FIG. 9. In other embodiments, other similar techniques for modifying the frame refresh rate cadence may be utilized to prevent a charge accumulation from occurring on the display panel.

Figure 10:
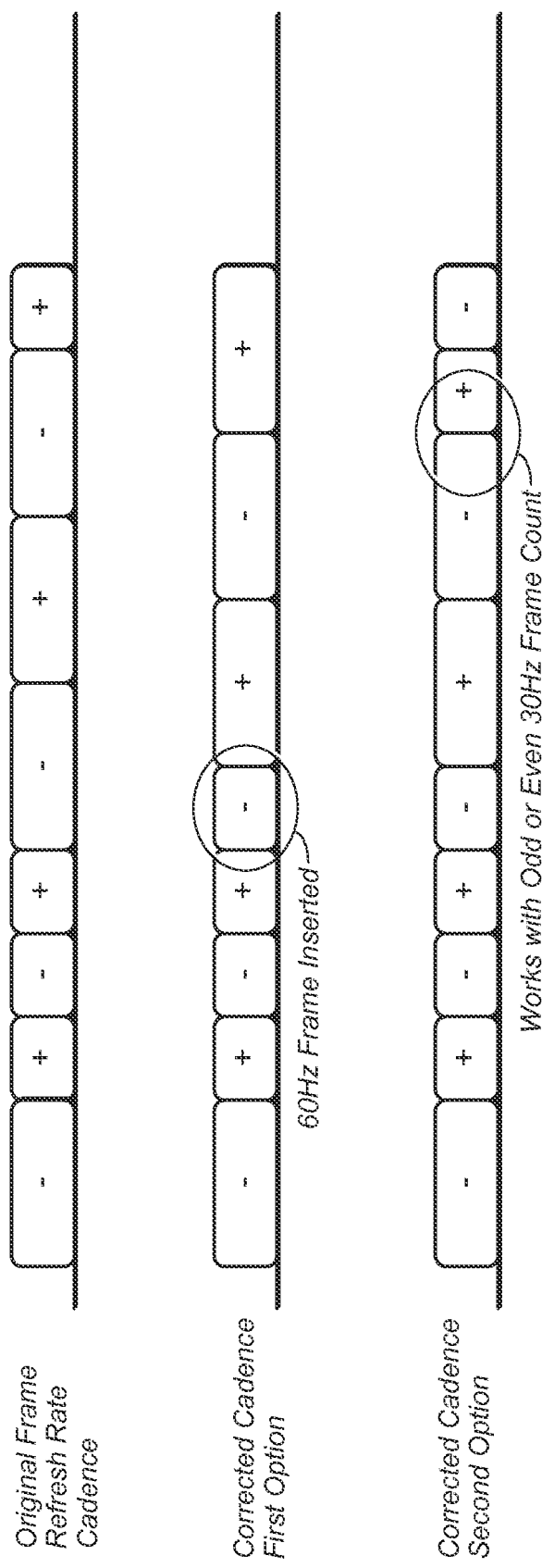
FIG. 10 is a timing diagram of another embodiment of corrected frame refresh rate cadences.

Turning now to FIG. 10, a timing diagram of another embodiment of corrected frame refresh rate cadences is shown. The original frame refresh rate cadence shown at the top of FIG. 10 begins with a single frame at the 30 Hz rate followed by three frames at the 60 Hz rate. Therefore, to prevent the net charge accumulation from occurring, a fourth frame may also be displayed at the 60 Hz rate, as shown in the corrected cadence—first option waveform. This waveform has four consecutive frames being displayed at the 60 Hz rate. The corrected cadence—second option waveform also has four consecutive frames being displayed at the 60 Hz rate. However, the second option waveform shows that this approach for correcting the original frame refresh rate cadence works for an odd or even 30 Hz frame count following the four consecutive frames being displayed at the 60 Hz rate.

Figure 11:
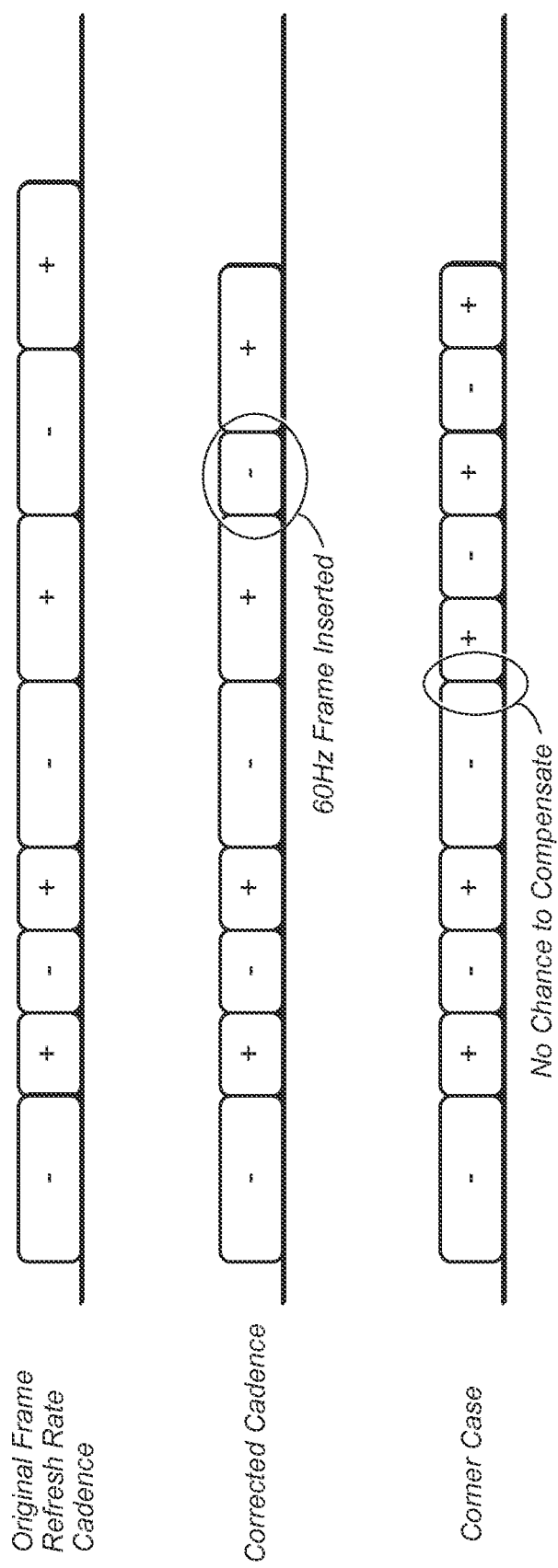
FIG. 11 is a timing diagram of another embodiment of corrected frame refresh rate cadences.

Referring now to FIG. 11, a timing diagram of another embodiment of corrected frame refresh rate cadences is shown. The original frame refresh rate cadence shown at the top of FIG. 10 begins with a single frame at the 30 Hz rate followed by three frames at the 60 Hz rate. In response to detecting the odd number of frames at 60 Hz before the frame refresh rate switches to 30 Hz, the display pipeline may be configured to add another frame at 60 Hz to make the total number of frames an even number of 4 frames at 60 Hz. However, rather than displaying the other frame at 60 Hz immediately following the three consecutive 60 Hz frames, the display pipeline may wait until two 30 Hz frames have been displayed before inserting the 60 Hz frame into the display sequence. This is shown in the corrected cadence waveform in the middle of FIG. 11. The bottom waveform shows a corner case where this approach would not be possible, since a single 30 Hz frame follows the three consecutive 60 Hz frames. The corner case illustrates a case when the display pipeline has no chance to compensate for the odd number of 60 Hz frames at a later point in the display sequence since only a single frame is displayed at the 30 Hz frame refresh rate.

Figure 12:
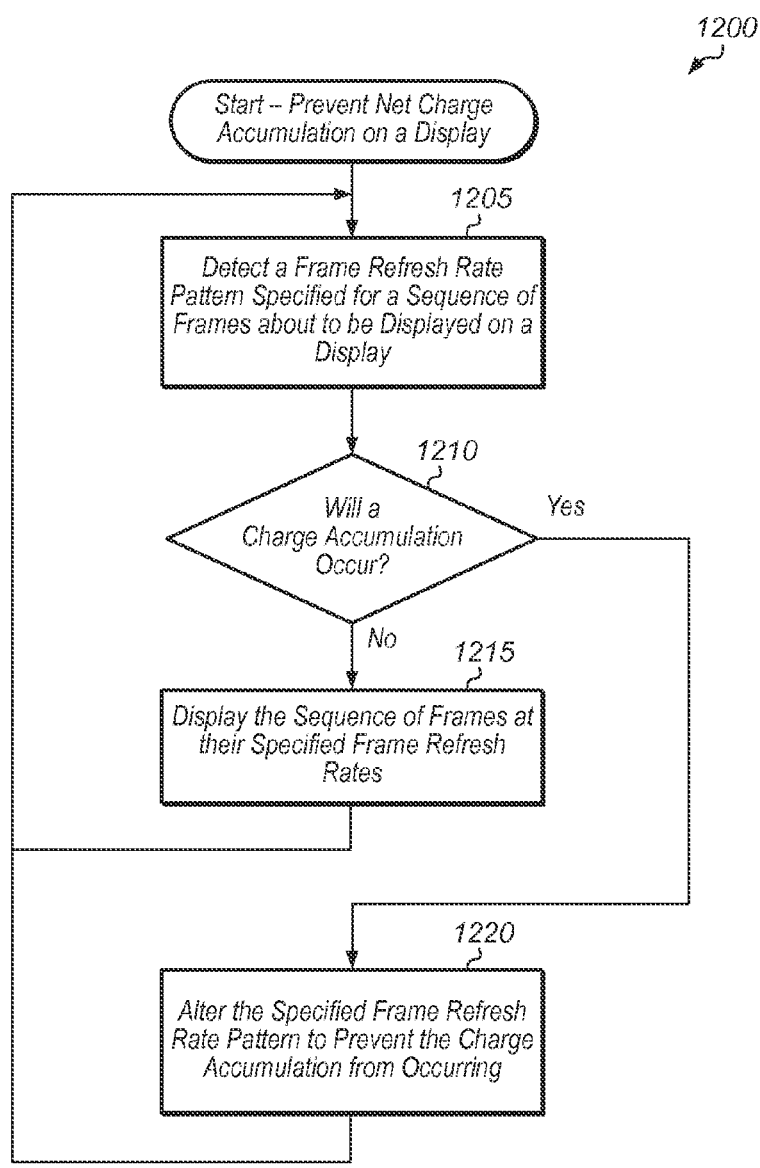
FIG. 12 is a generalized flow diagram illustrating one embodiment of a method for preventing net charge accumulation on a display.

Turning now to FIG. 12, one embodiment of a method 1200 for preventing charge accumulation on a display is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems, apparatuses, and/or display pipelines described herein may be configured to implement method 1200.

A display pipeline may be configured to detect a frame refresh rate pattern specified for a sequence of frames about to be displayed on a display (block 1205). In one embodiment, the display pipeline may detect the frame refresh rate pattern by retrieving the frame refresh rate settings in frame packets stored in the parameter FIFO. The parameter FIFO may store any number of frame packets corresponding to upcoming frames about to be displayed. Next, the display pipeline may determine if a net charge accumulation will occur on the display panel based on the detected frame refresh rate pattern (conditional block 1210). In one embodiment, the display pipeline may determine that a charge accumulation will occur if an odd number of frames will be displayed at a first frame refresh rate prior to the frame refresh rate changing to a second frame refresh rate, wherein the first frame refresh rate is different from the second frame refresh rate. In another embodiment, the display pipeline may calculate the net charge accumulation that will build up on the display panel based on the frame refresh rate pattern. In other embodiments, the display pipeline may utilize other techniques for determining if a net charge accumulation will build up on the display panel based on the frame refresh rate pattern.

If the display pipeline determines a charge accumulation will not occur on the display panel based on the specified frame refresh rate pattern (conditional block 1210, "no" leg), then the display pipeline may display the sequence of frames at their specified frame refresh rates (block 1215). If the display pipeline determines a charge accumulation will occur on the display panel based on the specified frame refresh rate pattern (conditional block 1210, "yes" leg), then the display pipeline may alter the specified frame refresh rate pattern to prevent the charge accumulation from occurring (block 1220). In one embodiment, the display pipeline may alter the specified frame refresh rate pattern by overriding the frame refresh rate setting for a given frame to generate an even number of frames at a first frame refresh rate when an odd number of frames are originally specified to be displayed at the first frame refresh rate. In other embodiments, the display pipeline may utilize other techniques for altering the specified frame refresh rate pattern to prevent the charge accumulation from occurring. After blocks 1215 and 1220, method 1200 may return to block 1205 with the display pipeline detecting a frame refresh rate pattern specified for the next sequence of frames about to be displayed.

Figure 13:
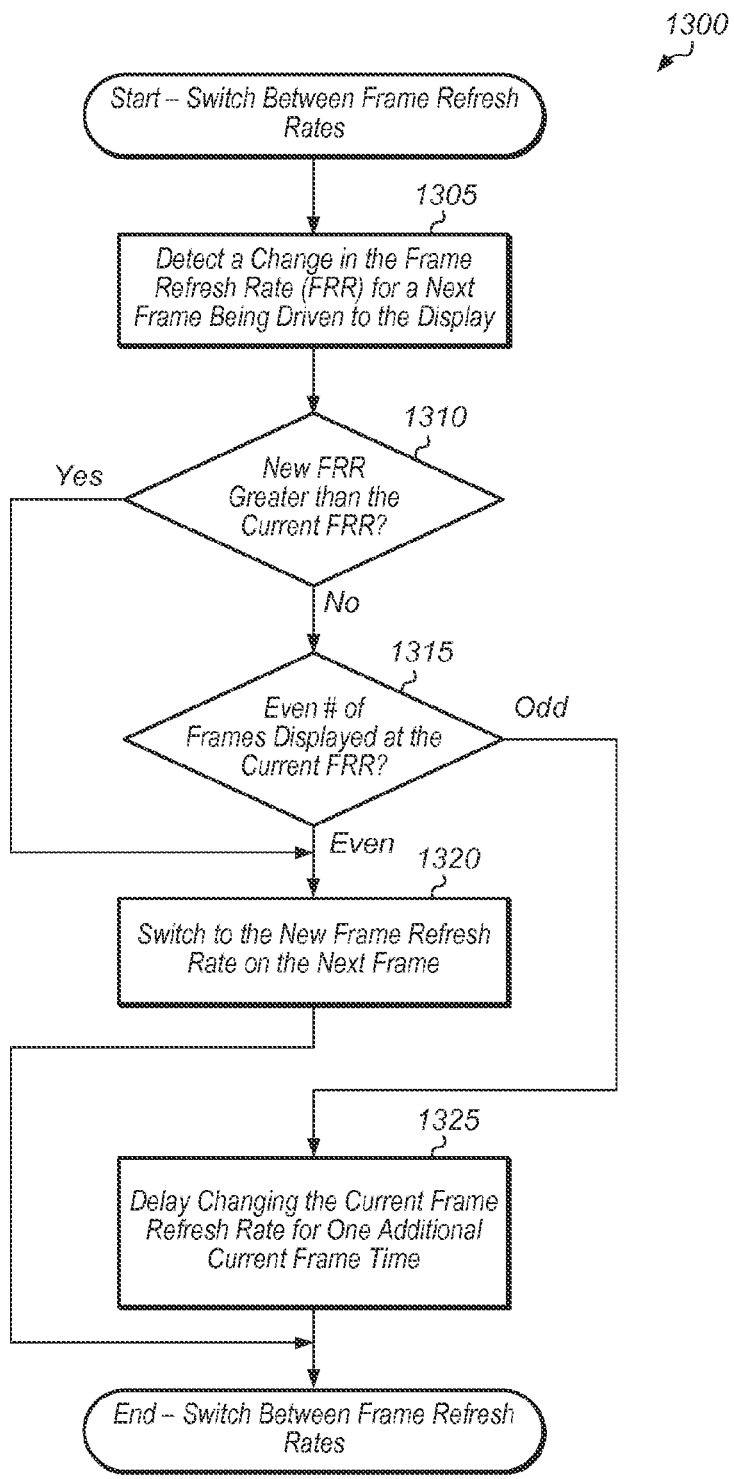
FIG. 13 is a generalized flow diagram illustrating one embodiment of a method for switching between frame refresh rates.

Referring now to FIG. 13, one embodiment of a method 1300 for switching between frame refresh rates is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems, apparatuses, and/or display pipelines described herein may be configured to implement method 1300.

A display pipeline may detect a change in the frame refresh rate for a next frame being driven to the display (block 1305). In one embodiment, the display pipeline may detect the change in the frame refresh rate pattern by retrieving, from the parameter FIFO, the frame refresh rate setting in the frame packet corresponding to the next frame. Responsive to detecting the change in the frame refresh rate, the display pipeline may determine if the new frame refresh rate (FRR) is greater than the current frame refresh rate (FRR) (conditional block 1310). If the current frame refresh rate is greater than the new frame refresh rate (conditional block 1310, "no" leg), then the display pipeline may determine if an even number of frames have been displayed at the current frame refresh rate (conditional block 1315). If the new frame refresh rate is greater than the current frame refresh rate (conditional block 1310, "yes" leg), then the display pipeline may switch to the new frame refresh rate as specified for the next frame without checking to see if the number of frames which were displayed at the current frame refresh rate is an even number (block 1320).

If an even number of frames have been displayed at the current frame refresh rate (conditional block 1315, "even" leg), then the display pipeline may switch to the new frame refresh rate on the next frame (block 1320). If an odd number of frames have been displayed at the current frame refresh rate (conditional block 1315, "odd" leg), then the display pipeline may delay changing the current frame refresh rate for one additional current frame time (block 1325). In one embodiment, the display pipeline may repeat the previous frame at the current frame refresh rate and simply delay the next frame until it can be displayed at the new frame refresh rate. In another embodiment, the display pipeline may override the frame refresh rate setting by displaying the next frame at the current frame refresh rate and then switch to the new frame refresh rate on the frame subsequent to the next frame. By overriding the frame refresh rate setting, the display pipeline adds an extra frame at the current frame refresh rate to ensure that the total number of frames displayed at the current frame refresh rate is an even number of frames before switching to the new frame refresh rate. After blocks 1320 and 1325, method 1300 may end.

Figure 14:
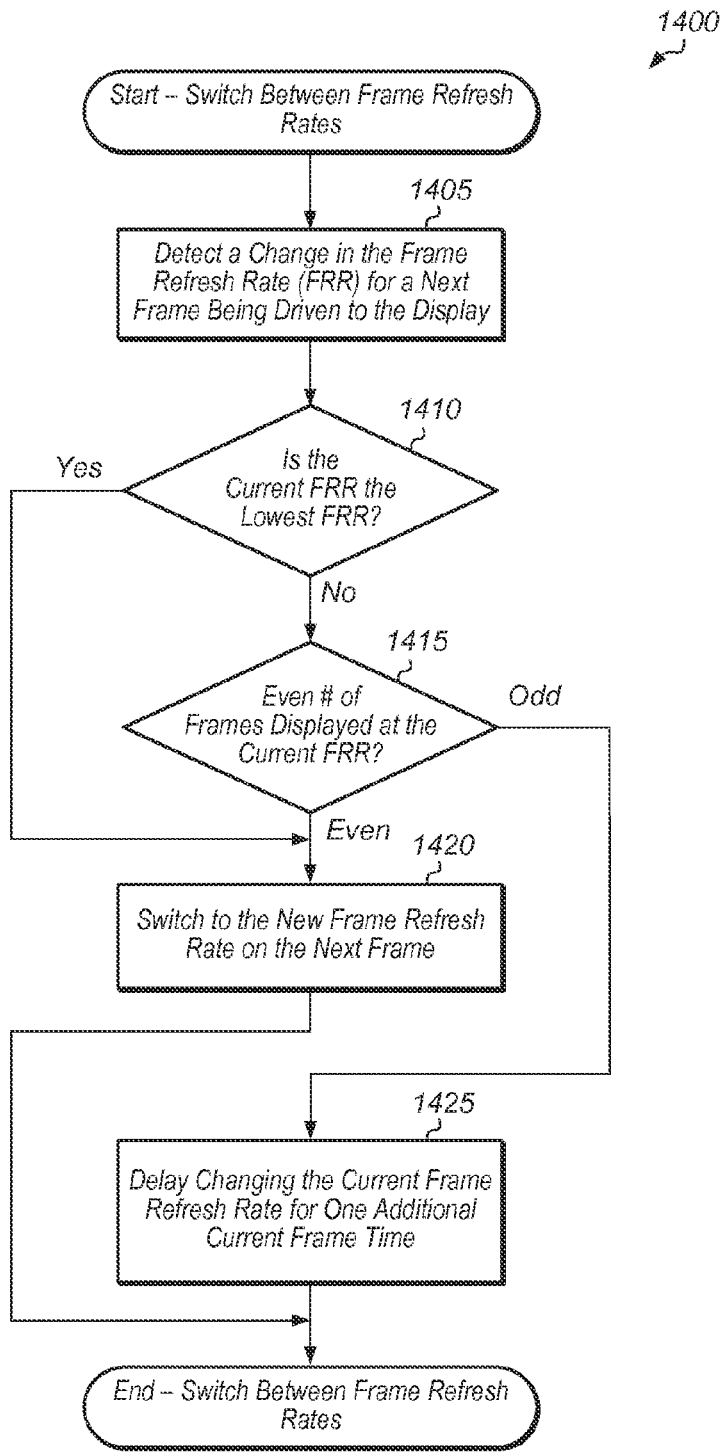
FIG. 14 is a generalized flow diagram illustrating another embodiment of a method for switching between frame refresh rates.

Referring now to FIG. 14, another embodiment of a method 1400 for switching between frame refresh rates is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems, apparatuses, and/or display pipelines described herein may be configured to implement method 1400.

A display pipeline may detect a change in the frame refresh rate for a next frame being driven to the display (block 1405). In one embodiment, the display pipeline may detect the change in the frame refresh rate pattern by retrieving, from the parameter FIFO, the frame refresh rate setting in the frame packet corresponding to the next frame. Responsive to detecting the change in the frame refresh rate, the display pipeline may determine if the current frame refresh rate (FRR) is the lowest frame refresh rate of a plurality of frame refresh rates being utilized for the display (conditional block 1410). For example, in one embodiment, the display pipeline may display frames at two frame refresh rates, 60 Hz and 30 Hz. In this embodiment, the display pipeline may determine if the current frame refresh rate is 30 Hz in conditional block 1410. In other embodiments, three or more frame refresh rates may be utilized, and the display pipeline may determine if the current frame refresh rate is the lowest frame refresh rate of these three or more frame refresh rates in conditional block 1410.

If the current frame refresh rate is not the lowest frame refresh rate of the plurality of frame refresh rates being utilized for the display (conditional block 1410, "no" leg), then the display pipeline may determine if an even number of frames have been displayed at the current frame refresh rate (conditional block 1415). If the current frame refresh rate is the lowest frame refresh rate of the plurality of frame refresh rates being utilized for the display (conditional block 1410, "yes" leg), then the display pipeline may switch to the new frame refresh rate as specified for the next frame without checking to see if the number of frames which were displayed at the current frame refresh rate is an even number (block 1420).

If an even number of frames have been displayed at the current frame refresh rate (conditional block 1415, "even" leg), then the display unit may switch to the new frame refresh rate on the next frame (block 1420). If an odd number of frames have been displayed at the current frame refresh rate (conditional block 1415, "odd" leg), then the display unit may delay changing the current frame refresh rate for one additional current frame time (block 1425). In one embodiment, the display pipeline may repeat the previous frame at the current frame refresh rate and simply delay the next frame until it can be displayed at the new frame refresh rate. In another embodiment, the display pipeline may override the frame refresh rate setting by displaying the next frame at the current frame refresh rate and then switch to the new frame refresh rate on the frame subsequent to the next frame. By overriding the frame refresh rate setting, the display pipeline adds an extra frame at the current frame refresh rate to ensure that the total number of frames displayed at the current frame refresh rate is an even number of frames before switching to the new frame refresh rate. After blocks 1420 and 1425, method 1400 may end.

Figure 15:
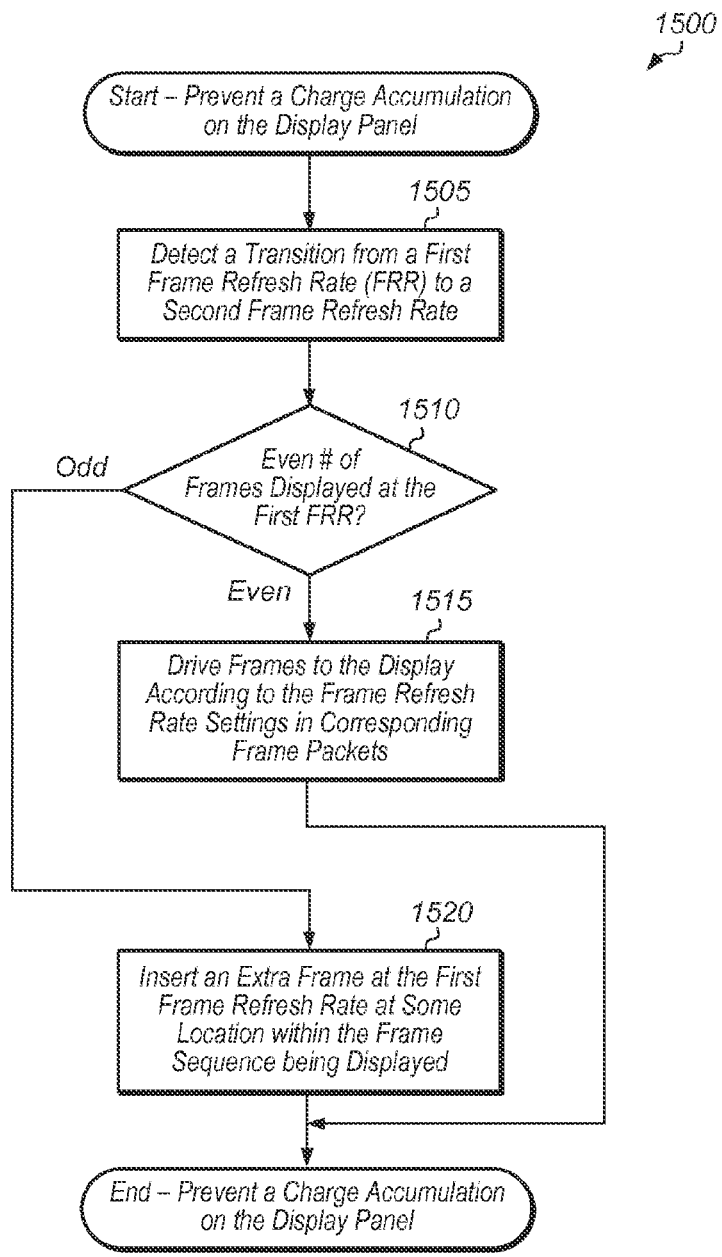
FIG. 15 is a generalized flow diagram illustrating one embodiment of a method for preventing a charge accumulation on the display panel.

Turning now to FIG. 15, one embodiment of a method 1500 for preventing a charge accumulation on the display panel is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems, apparatuses, and/or display pipelines described herein may be configured to implement method 1500.

A display pipeline may detect a transition from a first frame refresh rate to a second frame refresh rate which is specified for a given frame (block 1505). The display pipeline may detect the transition from the frame refresh rate specified in a frame packet corresponding to the given frame. In response to detecting the transition from the first frame refresh rate to the second frame refresh rate, the display pipeline may determine if an even number of frames have been displayed at the first frame refresh rate (conditional block 1510).

If an even number of frames have been displayed at the first frame refresh rate (conditional block 1510, "even" leg), then the display pipeline may drive frames to the display according to the frame refresh rate settings in corresponding frame packets (block 1515). If an odd number of frames have been displayed at the first frame refresh rate (conditional block 1510, "odd" leg), then the display pipeline may insert an extra frame at the first frame refresh rate at some location within the frame sequence being displayed (block 1520). In one embodiment, the display pipeline may insert the extra frame at the end of the sequence of the odd number of frames being displayed at the first frame refresh rate. In another embodiment, the display pipeline may insert the extra frame immediately after an even number of frames have been displayed at the second frame refresh rate. After block 1520, method 1500 may end.

Figure 16:
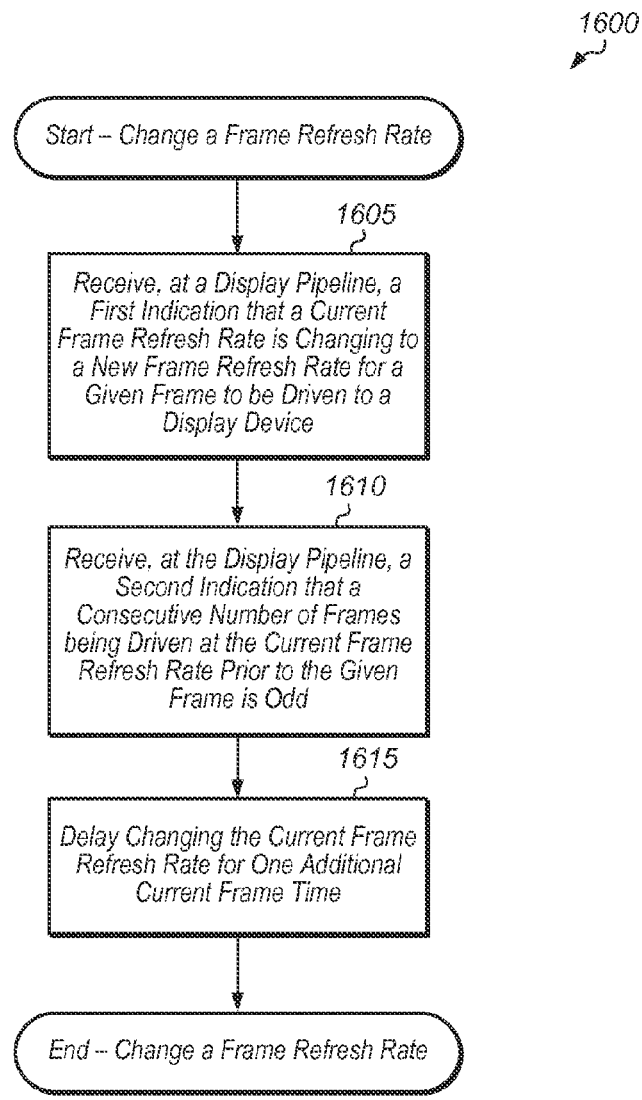
FIG. 16 is a generalized flow diagram illustrating one embodiment of a method for changing a frame refresh rate.

Turning now to FIG. 16, one embodiment of a method 1600 for changing a frame refresh rate is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems, apparatuses, and/or display pipelines described herein may be configured to implement method 1600.

A display pipeline may receive a first indication that a current frame refresh rate is changing to a new frame refresh rate for a given frame to be driven to a display device (block 1605). In one embodiment, the display pipeline may be located within a SoC, and software executing on the SoC may be configured to detect that the current frame refresh rate is changing to the new frame refresh rate and generate and convey the first indication to the display pipeline. In one embodiment, the software may provide the display pipeline with a frame number on which the display pipeline should transition to the new frame refresh rate. For the purposes of this discussion, it will be assumed that the new frame refresh rate is different from the current frame refresh rate. In one embodiment, the period of the new frame refresh rate may be an integer multiple of the period of the current frame refresh rate. For example, the current frame refresh rate may be 60 Hz and the new frame refresh rate may be 30 Hz, 20 Hz, 15 Hz, 12 Hz, 10 Hz, or any other integer multiple of 60 Hz.

Next, the display pipeline may receive a second indication that a consecutive number of frames being driven at the current frame refresh rate prior to the given frame is odd (block 1610). In one embodiment, software executing on the SoC may generate and convey the second indication to the display pipeline. In one embodiment, the software may determine whether the number of frames is even or odd by looking at and recording the frame number in the display pipeline each time the frame refresh rate changes.

In response to receiving the second indication, the display pipeline may be configured to delay changing the current frame refresh rate for one additional current frame time (block 1615). In one embodiment, the display pipeline may override the new frame refresh rate for the given frame and specify the current frame refresh rate for the given frame. In another embodiment, the display pipeline may repeat the previous frame (i.e., most recently displayed frame) at the current frame refresh rate and delay the given frame so that the given frame is displayed at the new frame refresh rate. After block 1615, method 1600 may end.

Figure 17:
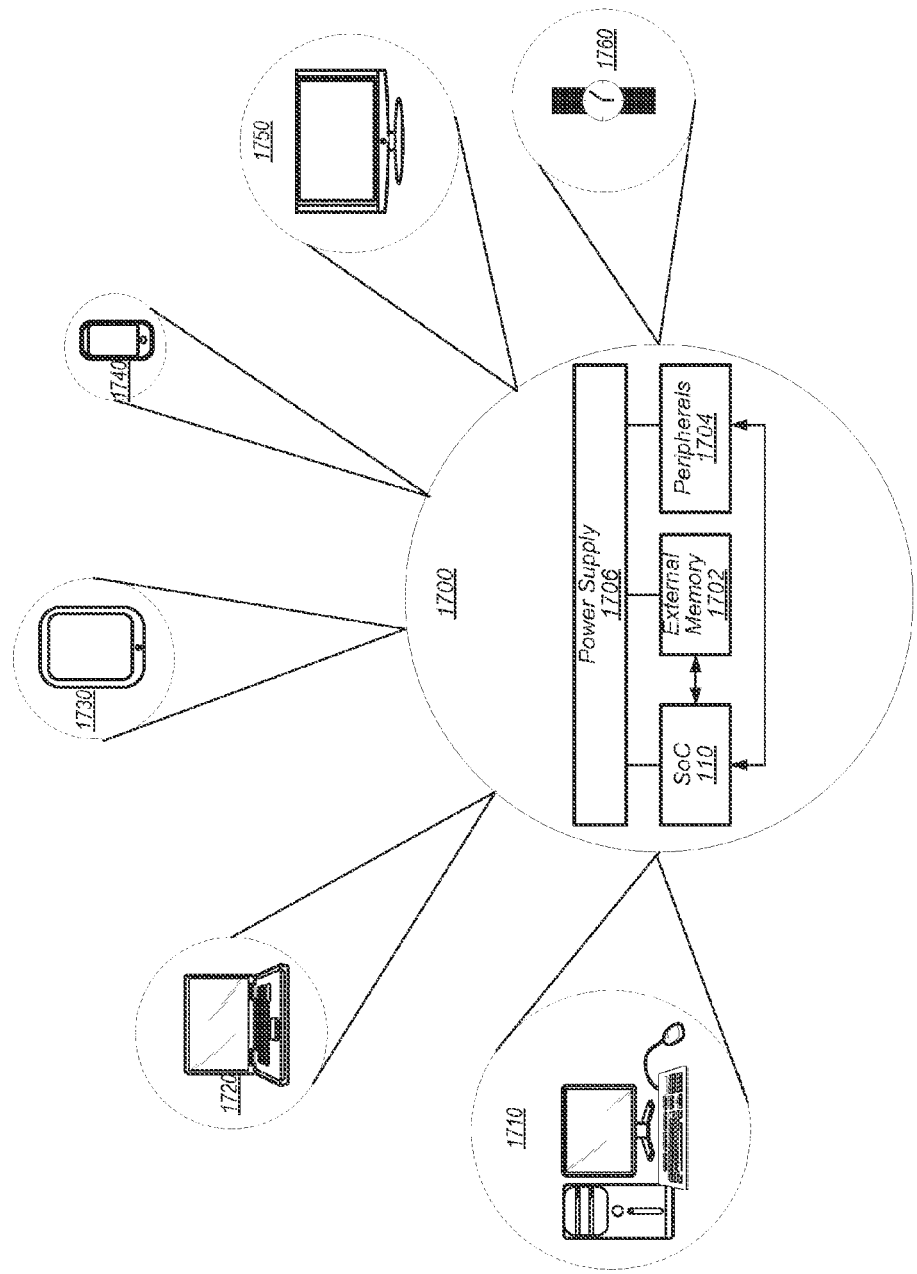
FIG. 17 is a block diagram of one embodiment of a system.

Turning next to FIG. 17, a block diagram of one embodiment of a system 1700 is shown. As shown, system 1700 may represent chip, circuitry, components, etc., of a desktop computer 1710, laptop computer 1720, tablet computer 1730, cell phone 1740, television 1750 (or set top box configured to be coupled to a television), wrist watch or other wearable item 1760, or otherwise. Other devices are possible and are contemplated. In the illustrated embodiment, the system 1700 includes at least one instance of SoC 110 (of FIG. 1) coupled to an external memory 1702.

SoC 110 is coupled to one or more peripherals 1704 and the external memory 1702. A power supply 1706 is also provided which supplies the supply voltages to SoC 110 as well as one or more supply voltages to the memory 1702 and/or the peripherals 1704. In various embodiments, power supply 1706 may represent a battery (e.g., a rechargeable battery in a smart phone, laptop or tablet computer). In some embodiments, more than one instance of SoC 110 may be included (and more than one external memory 1702 may be included as well).

The memory 1702 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with SoC 110 in a chip-on-chip configuration, a package-on-package configuration, or a multi-chip module configuration.

The peripherals 1704 may include any desired circuitry, depending on the type of system 1700. For example, in one embodiment, peripherals 1704 may include devices for various types of wireless communication, such as wifi, Bluetooth, cellular, global positioning system, etc. The peripherals 1704 may also include additional storage, including RAM storage, solid state storage, or disk storage. The peripherals 1704 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a display device capable of accumulating charge based on a polarity of a displayed frame; and
   a display pipeline coupled to the display device, wherein the display pipeline is configured to:
   receive a first indication that a current frame refresh rate is changing to a new frame refresh rate for a given frame to be driven to a display device, wherein the new frame refresh rate is different from the current frame refresh rate; and
   delay changing the current frame refresh rate for one additional current frame time in response to receiving a second indication that a consecutive number of frames being driven at the current frame refresh rate prior to the given frame is odd.

2. The system as recited in claim 1, wherein a voltage polarity of the display device alternates on consecutive frames.

3. The system as recited in claim 1, wherein the display pipeline is further configured to:

override the new frame refresh rate for the given frame and specify the current frame refresh rate for the given frame; and specify the new frame refresh rate for one or more frames following the given frame.

4. The system as recited in claim 1, wherein the current frame refresh rate is greater than the new frame refresh rate.

5. The system as recited in claim 4, wherein a period of the new frame refresh rate is an integer multiple of a period of the current frame refresh rate.

6. The system as recited in claim 1, wherein the display pipeline is further configured to repeat a previous frame at the current frame refresh rate and delay the given frame so that the given frame is displayed at the new frame refresh rate.

7. The system as recited in claim 1, wherein the display device comprises a liquid crystal display (LCD).

8. A computing system comprising:
a memory configured to store frame data;
a display device; and
a display pipeline configured to:
receive a first indication that a current frame refresh rate is changing to a new frame refresh rate for a given frame to be driven to the display device, wherein the new frame refresh rate is different from the current frame refresh rate; and
delay changing the current frame refresh rate for one additional current frame time in response to receiving a second indication that a consecutive number of frames being driven at the current frame refresh rate prior to the given frame is odd.

9. The computing system as recited in claim 8, wherein a voltage polarity of the display device alternates on consecutive frames.

10. The computing system as recited in claim 8, wherein the display pipeline is further configured to:
override the new frame refresh rate for the given frame and specify the current frame refresh rate for the given frame; and
specify the new frame refresh rate for one or more frames following the given frame.

11. The computing system as recited in claim 8, wherein the current frame refresh rate is greater than the new frame refresh rate.

12. The computing system as recited in claim 11, wherein a period of the new frame refresh rate is an integer multiple of a period of the current frame refresh rate.

13. The computing system as recited in claim 8, wherein the display pipeline is further configured to repeat a previous frame at the current frame refresh rate and delay the given frame so that the given frame is displayed at the new frame refresh rate.

14. The computing system as recited in claim 8, wherein the display device is a liquid crystal display (LCD).

15. A method comprising:
receiving, at a display pipeline, a first indication that a current frame refresh rate is changing to a new frame refresh rate for a given frame to be driven to a display device, wherein the new frame refresh rate is different from the current frame refresh rate; and
delaying changing the current frame refresh rate for one additional current frame time in response to receiving a second indication that a consecutive number of frames being driven at the current frame refresh rate prior to the given frame is odd.

16. The method as recited in claim 15, wherein a voltage polarity of the display device alternates on consecutive frames.

17. The method as recited in claim 15, further comprising:
overriding the new frame refresh rate for the given frame and specify the current frame refresh rate for the given frame; and
specifying the new frame refresh rate for one or more frames following the given frame.

18. The method as recited in claim 15, wherein the current frame refresh rate is greater than the new frame refresh rate.

19. The method as recited in claim 18, wherein a period of the new frame refresh rate is an integer multiple of a period of the current frame refresh rate.

20. The method as recited in claim 15, wherein the display device is a liquid crystal display (LCD).

* * * * *